US012657431B2

(12) United States Patent
Wang et al.

(10) Patent No.: US 12,657,431 B2
(45) Date of Patent: Jun. 16, 2026

(54) IMAGE PROCESSING METHOD AND APPARATUS

(71) Applicant: Huawei Technologies Co., Ltd., Shenzhen (CN)

(72) Inventors: Yinting Wang, Hangzhou (CN); Xi Zhang, Hangzhou (CN); Ruihua Li, Shenzhen (CN); Liping Zhang, Hangzhou (CN); Yining Huang, Hangzhou (CN); Yi Lei, Hangzhou (CN); Zuquan Zheng, Hangzhou (CN); Yifan Zhang, Hangzhou (CN); Xin Li, Hangzhou (CN); Xiaowei Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1062 days.

(21) Appl. No.: 17/698,698

(22) Filed: Mar. 18, 2022

(65) Prior Publication Data

US 2022/0207680 A1 Jun. 30, 2022

Related U.S. Application Data

(63) Continuation of application No. PCT/CN2020/103377, filed on Jul. 22, 2020.

(30) Foreign Application Priority Data

Sep. 18, 2019 (CN) .......................... 201910882529.3

(51) Int. Cl.
*G06N 3/045* (2023.01)
*G06T 3/4053* (2024.01)
(Continued)

(52) U.S. Cl.
CPC ........... *G06N 3/045* (2023.01); *G06T 3/4053* (2013.01); *G06T 5/50* (2013.01); *G06T 5/60* (2024.01);
(Continued)

(58) Field of Classification Search
CPC ........... G06T 5/50; G06T 3/4053; G06T 5/70; G06T 5/73; G06T 5/90;
(Continued)

(56) References Cited

U.S. PATENT DOCUMENTS 10,552,944 B2* 2/2020 Wang ..................... G06T 3/4046
11,288,789 B1* 3/2022 Chen ....................... G06T 7/001
(Continued)

FOREIGN PATENT DOCUMENTS

CN 107302657 A 10/2017
CN 108492265 A 9/2018
(Continued)

OTHER PUBLICATIONS

Qian et al., English translation of CN109889800A, published Jun. 14, 2019.*
(Continued)

*Primary Examiner* — Xuemei G Chen
(74) *Attorney, Agent, or Firm* — Conley Rose, P.C.

(57) ABSTRACT

An image processing method includes obtaining a plurality of frames of raw images. After preprocessing such as image alignment, channel splitting or pixel rearrangement is performed on the obtained plurality of frames of raw images, detail restoration is performed on an image based on a deep learning network, and luminance enhancement and color enhancement are performed on an image output by the deep learning network. A plurality of types of processing related to detail restoration are integrated into a same deep learning network.

20 Claims, 14 Drawing Sheets

(51) Int. Cl.

| | | |
|---|---|---|
| *G06T 5/50* | (2006.01) | |
| *G06T 5/60* | (2024.01) | |
| *G06T 5/70* | (2024.01) | |
| *G06T 5/73* | (2024.01) | |
| *G06T 5/90* | (2024.01) | |

(52) U.S. Cl.
CPC ................. *G06T 5/70* (2024.01); *G06T 5/73* (2024.01); *G06T 5/90* (2024.01); *G06T 2207/10024* (2013.01); *G06T 2207/20081* (2013.01); *G06T 2207/20084* (2013.01); *G06T 2207/20221* (2013.01)

(58) Field of Classification Search
CPC .......... G06T 2207/10024; G06T 2207/20081; G06T 2207/20084; G06T 2207/20221; G06T 5/60; G06T 3/4015; G06T 7/90; G06N 3/045; G06N 3/08; H04N 23/12; H04N 23/843; H04N 25/131; H04N 25/134; H04N 25/135
See application file for complete search history.

(56) References Cited

U.S. PATENT DOCUMENTS

| | | | | |
|---|---|---|---|---|
| 11,455,443 | B1* | 9/2022 | Schubert | G06F 30/23 |
| 2001/0008419 | A1* | 7/2001 | Sano | H04N 23/70 348/222.1 |
| 2007/0071362 | A1* | 3/2007 | Milanfar | G06T 3/4076 382/299 |
| 2008/0165359 | A1* | 7/2008 | Mattox | G01J 4/04 356/367 |
| 2009/0060389 | A1 | 3/2009 | Hasegawa et al. | |
| 2009/0080791 | A1* | 3/2009 | Chen | H04N 23/70 382/266 |
| 2012/0274817 | A1* | 11/2012 | Sun | H04N 25/611 348/241 |
| 2013/0044194 | A1* | 2/2013 | Tilt | H04N 1/2141 348/61 |
| 2014/0072214 | A1* | 3/2014 | Tanaka | H04N 25/135 382/165 |
| 2014/0294291 | A1* | 10/2014 | Zhang | G06V 10/774 382/159 |
| 2015/0206504 | A1* | 7/2015 | Pajak | G09G 5/026 345/589 |
| 2016/0080626 | A1* | 3/2016 | Kovtun | G06T 5/70 348/218.1 |
| 2016/0110657 | A1* | 4/2016 | Gibiansky | G06N 20/00 706/12 |
| 2017/0104897 | A1* | 4/2017 | Kang | H04N 23/57 |
| 2018/0276783 | A1* | 9/2018 | Yasuda | H04N 23/73 |
| 2019/0156524 | A1* | 5/2019 | Park | G06T 5/60 |
| 2019/0371311 | A1* | 12/2019 | Patel | G06F 3/167 |
| 2020/0065646 | A1* | 2/2020 | Mahmoud | G06N 3/04 |
| 2020/0137290 | A1* | 4/2020 | Lee | H04N 25/583 |
| 2020/0279358 | A1* | 9/2020 | Li | G06T 7/0002 |
| 2020/0294225 | A1* | 9/2020 | Lin | G06V 10/809 |
| 2020/0387713 | A1* | 12/2020 | Kanthan | G06N 3/08 |
| 2020/0387753 | A1* | 12/2020 | Brill | G06N 20/20 |
| 2020/0394772 | A1* | 12/2020 | Afra | G06T 5/60 |
| 2020/0396442 | A1* | 12/2020 | Shin | H04N 25/00 |
| 2021/0073957 | A1* | 3/2021 | Slabaugh | H04N 9/646 |
| 2021/0256657 | A1* | 8/2021 | Meng | G06N 3/045 |

FOREIGN PATENT DOCUMENTS

| | | |
|---|---|---|
| CN | 109410123 A | 3/2019 |
| CN | 109889800 A | 6/2019 |
| CN | 109978788 A | 7/2019 |
| CN | 110211057 A | 9/2019 |

OTHER PUBLICATIONS

Eilertsen, Gabriel, et al. "HDR image reconstruction from a single exposure using deep CNNs." ACM transactions on graphics (TOG) 36.6 (2017): 1-15.*

Khunteta, Ajay, and Debashish Ghosh. "Fuzzy rule-based image exposure level estimation and adaptive gamma correction for contrast enhancement in dark images." 2012 IEEE 11th international conference on signal processing. vol. 1. IEEE, 2012.*

Qian G, Gu J, Ren JS, Dong C, Zhao F, Lin J. Trinity of pixel enhancement: a joint solution for demosaicking, denoising and super-resolution. arXiv preprint arXiv:1905.02538. May 2019;1(3):4.*

Xing W, Egiazarian K. End-to-end learning for joint image demosaicing, denoising and super-resolution. InProceedings of the IEEE/CVF conference on computer vision and pattern recognition 2021 (pp. 3507-3516).*

Guocheng Qian et al: "Trinity of Pixel Enhancement: a Joint Solution for Demosaicking, Denoising and Super-Resolution", arxiv.org, Cornell University Library, 201 Olin Library Cornell University Ithaca, NY 14853, May 7, 2019, XP081273276, 10 pages.

Rastislav Lukac: "Single-sensor imaging in consumer digital cameras: a survey of recent advances and future directions", Journal of Real-Time Image Processing, vol. 1 No. 1, Mar. 1, 2006, pp. 45-52, XP055017501, 8 pages.

Ronnachai Jaroensri et al: "Generating Training Data for Denoising Real RGB Images via Camera Pipeline Simulation", arxiv.org, Cornell University Library, 201 Olin Library Cornell University Ithaca, NY 14853, Apr. 18, 2019 (Apr. 18, 2019), XP081171167, 10 pages.

Sivalogeswaran Ratnasingam: "Deep Camera: A Fully Convolutional Neural Network for Image Signal Processing", arxiv.org, Cornell University Library, 201 Olin Library Cornell University Ithaca, NY 14853, Aug. 24, 2019 (Aug. 24, 2019), XP081469259, 11 pages.

Z. Liang, et al, "CameraNet: A Two-Stage Framework for Effective Camera ISP Learning," Aug. 8, 2019, 13 pages.

B. Wronski, et al, "Handheld Multi-Frame Super-Resolution," Feb. 16, 2021, 24 pages.

G. Qian, et al, "Rethinking the Pipeline of Demosaicing, Denoising and Super-Resolution," Mar. 29, 2021, 16 pages.

B. Wronski, et al, "See Better and Further with Super Res Zoom on the Pixel 3," Oct. 15, 2018, 10 pages.

Di Zhao,et al,"End-to-End Denoising of Dark Burst Images Using Recurrent Fully Convolutional Networks", arXiv:1904.07483v1 [cs.CV] Apr. 16, 2019, XP81169837A, total 8 pages.

* cited by examiner

200

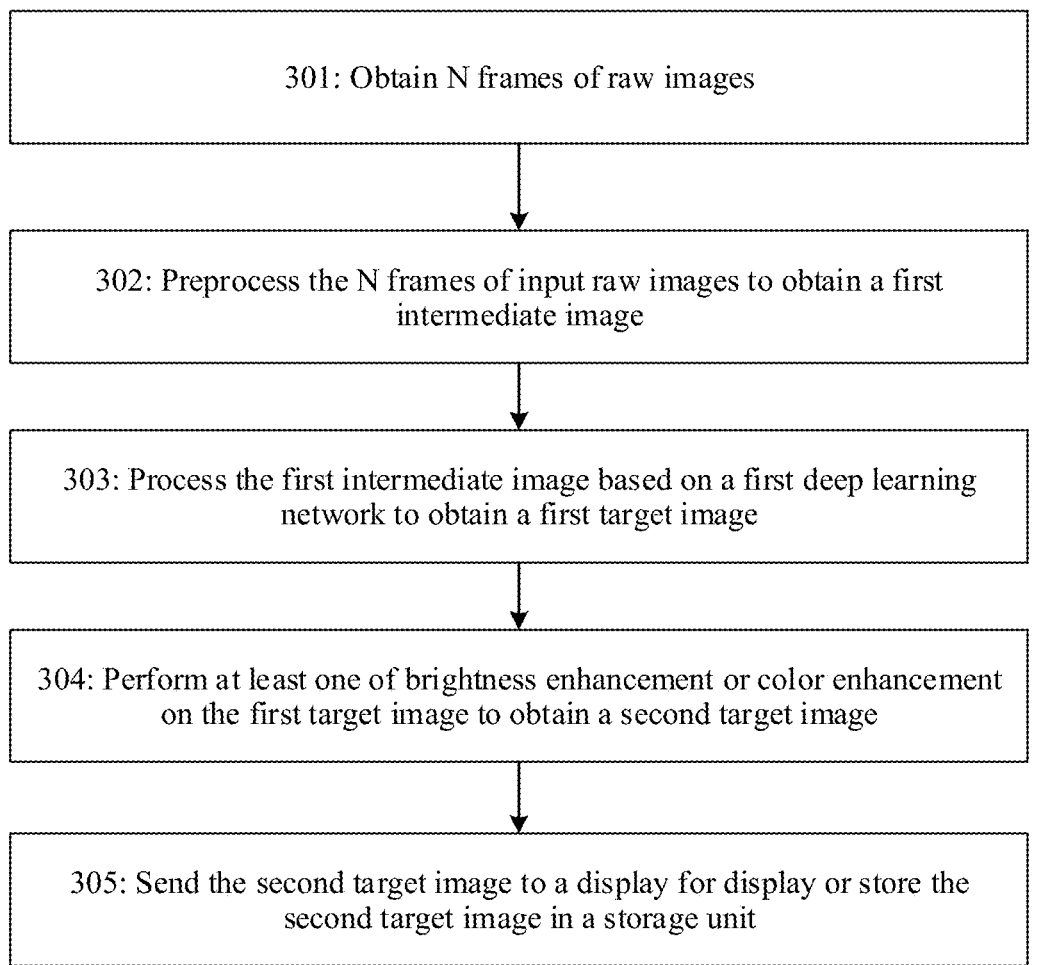

301: Obtain N frames of raw images

302: Preprocess the N frames of input raw images to obtain a first intermediate image 303: Process the first intermediate image based on a first deep learning network to obtain a first target image 304: Perform at least one of brightness enhancement or color enhancement on the first target image to obtain a second target image 305: Send the second target image to a display for display or store the second target image in a storage unit

FIG. 3

| R | G | R | G |
|---|---|---|---|
| G | B | G | B |
| R | G | R | G |
| G | B | G | B |

FIG. 4A

| R | G | R | G |
|---|---|---|---|
| IR | B | IR | B |
| R | G | R | G |
| IR | B | IR | B |

FIG. 4B

| R | R | G | G |
|---|---|---|---|
| R | R | G | G |
| G | G | B | B |
| G | G | B | B |

FIG. 5 k3n64s1                k3n128s1 k3n128s1               k3n128s1 k3n128s1
k3n3s1
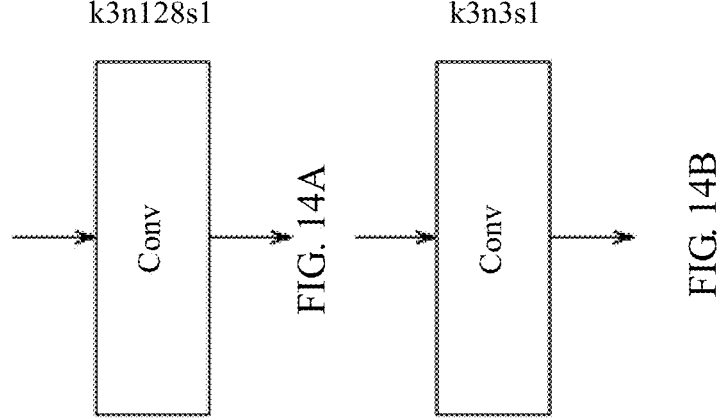
FIG. 14A
FIG. 14B
k3n256s1
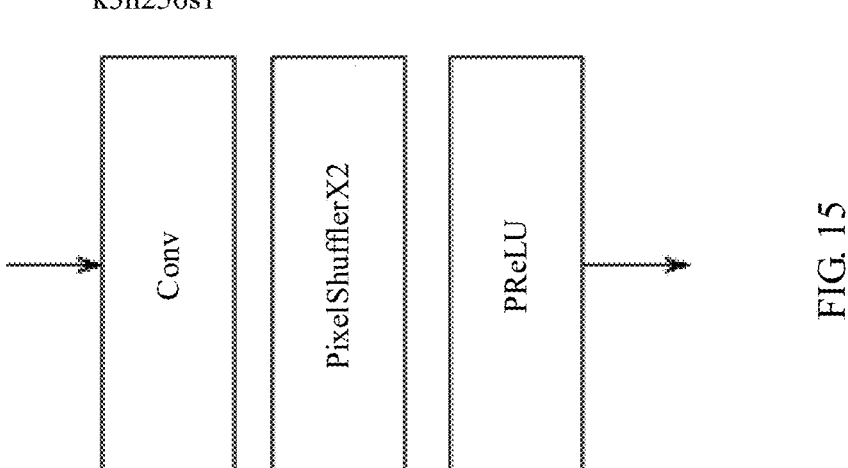
FIG. 15

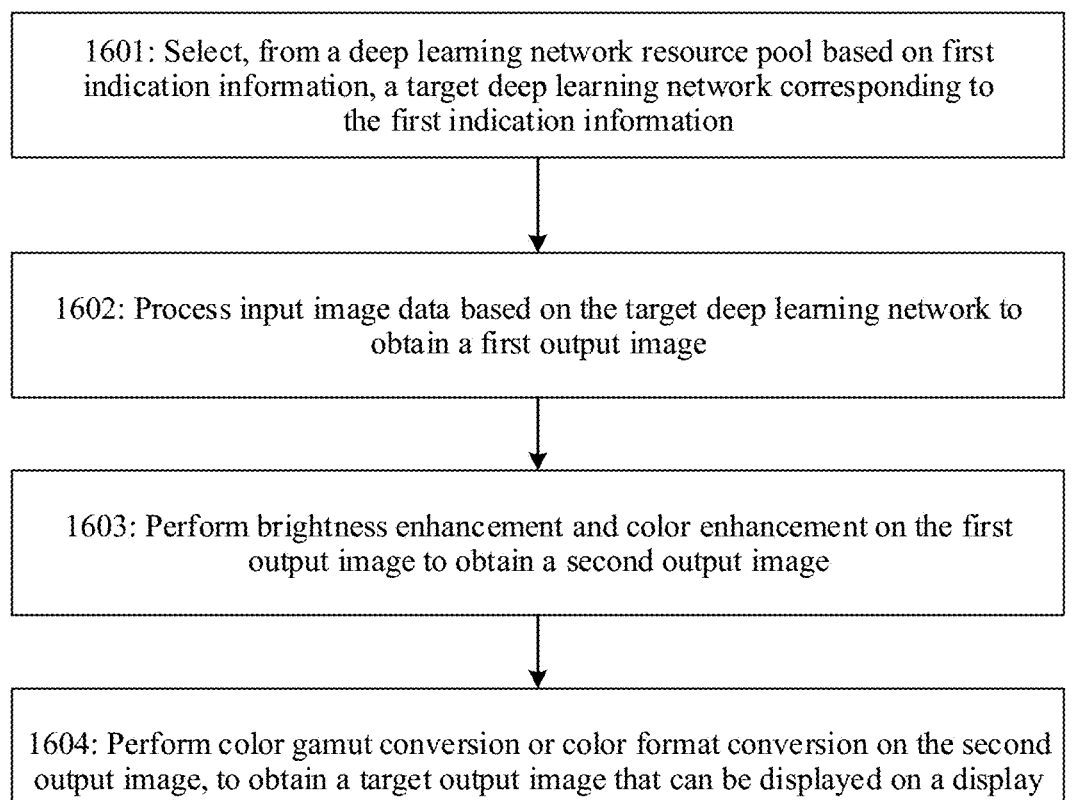

1601: Select, from a deep learning network resource pool based on first indication information, a target deep learning network corresponding to the first indication information 1602: Process input image data based on the target deep learning network to obtain a first output image 1603: Perform brightness enhancement and color enhancement on the first output image to obtain a second output image 1604: Perform color gamut conversion or color format conversion on the second output image, to obtain a target output image that can be displayed on a display

FIG. 16

IMAGE PROCESSING METHOD AND APPARATUS

CROSS-REFERENCE TO RELATED APPLICATIONS

This is a continuation of International Patent Application No. PCT/CN2020/103377 filed on Jul. 22, 2020, which claims priority to Chinese Patent Application No. 201910882529.3 filed on Sep. 18, 2019. The disclosures of the aforementioned applications are hereby incorporated by reference in their entireties.

TECHNICAL FIELD

This application relates to the field of artificial intelligence, and in particular, to an image processing method and apparatus in a computer vision technology.

BACKGROUND

Photographing has become one of the most commonly used functions of various mobile terminals, such as a mobile phone, a tablet computer, smart glasses, and a wearable device. Image detail restoration capability, image definition, and the like may be considered as the most important evaluation criteria for measuring photographing quality. However, nowadays mobile terminal devices become lighter and thinner, and a mobile terminal size is more strictly restricted, resulting in a difference between physical components of a mobile terminal camera and a single-lens reflex (SLR) camera. Therefore, an image needs to be processed by using an algorithm, so as to improve an image detail and definition as far as possible on the premise of ensuring the light and thin characteristic of the mobile terminals.

Generally, an image obtained by a camera is an unprocessed raw image, and a series of image processing operations need to be performed to convert the raw image into a color image that can be displayed, such as a red green blue (RGB) image. In a conventional image signal processing (ISP) model, a plurality of image processing operations are sequentially performed in a specific order. However, the plurality of image processing operations affect each other. Therefore, serial operations of a plurality of modules may cause errors to accumulate gradually, thereby reducing image quality.

SUMMARY

Embodiments of this application provide an image processing method and apparatus, to reduce error accumulation caused by serial operations of a plurality of modules, and improve image quality.

A first aspect of this application provides an image processing method. The method includes: obtaining a plurality of frames of raw images; preprocessing the plurality of frames of raw images to obtain a first intermediate image, where the preprocessing includes channel splitting and pixel rearrangement, the first intermediate image includes sub-images belonging to a plurality of channels, and a sub-image of each channel includes only one color component; processing the first intermediate image based on a first deep learning network to obtain a first target image, where functions of the first deep learning network include demosaicing (DM) and noise reduction; and performing at least one of brightness enhancement or color enhancement on the first target image to obtain a second target image.

Both demosaicing and noise reduction are operations related to detail restoration. If demosaicing processing is first performed, a noise reduction effect is affected. If noise reduction is first performed, a demosaicing effect is affected. In this embodiment of this application, demosaicing and noise reduction are implemented by using a same deep learning network, which avoids error accumulation caused by mutual impact between different processing when a plurality of types of processing are serially performed, and improves an effect of image detail restoration. Further, in this embodiment of this application, N frames of raw images are simultaneously input, so that valid information of the plurality of frames of images is fused, which helps better restore image details. In addition, before the images are input to the deep learning network for detail restoration, preprocessing such as channel splitting and pixel rearrangement is first performed on the N frames of images, which improves a processing effect of the deep learning network.

In a possible implementation, the functions of the first deep learning network further include super-resolution (SR) reconstruction, the raw image has a first resolution, the first target image has a second resolution, and the second resolution is greater than the first resolution.

In scenarios with a super-resolution requirement, demosaicing, noise reduction, and SR processing are key processing for detail restoration. If DM and SR processing are first performed, noise of an image is amplified or a noise form of a raw image is damaged, which affects a noise reduction effect. If noise reduction is first performed, a detail loss caused by noise reduction processing cannot be compensated for, which affects an effect of DM, SR, or other processing. In this embodiment of this application, three functions of demosaicing, noise reduction, and SR reconstruction may be simultaneously implemented by training a deep learning network, and there is no processing order when demosaicing, noise reduction, and SR reconstruction related to detail restoration are performed on an image by using the deep learning network, which avoids mutual impact between different processing caused by serial operations of a plurality of modules, and avoids error accumulation caused by the impact.

In a possible implementation, the functions of the first deep learning network further include at least one of defect pixel correction or phase pixel compensation.

Defect pixel correction and phase pixel compensation are also algorithms related to detail restoration. In this embodiment of this application, demosaicing, noise reduction, defect pixel correction, and phase pixel compensation functions are simultaneously implemented by using a same deep learning network, which avoids error accumulation caused by mutual impact between different processing when a plurality of different types of processing are serially performed, and improves an effect of image detail restoration.

In a possible implementation, the preprocessing further includes at least one of defect pixel correction or phase pixel compensation.

A position of a phase pixel is basically fixed, and a defect pixel correction algorithm is relatively mature. Therefore, a defect pixel and a phase pixel may be marked on a production line, and then defect pixel correction and phase pixel compensation may be implemented in preprocessing, which simplifies computation complexity of the deep learning network.

In a possible implementation, the functions of the first deep learning network further include sharpening.

In this embodiment of this application, demosaicing, noise reduction, sharpening, defect pixel correction, and phase pixel compensation functions are simultaneously implemented by using a same deep learning network, which avoids error accumulation caused by mutual impact between different processing when a plurality of different types of processing are serially performed, and improves an effect of image detail restoration.

In a possible implementation, the method further includes: sharpening the second target image to obtain a third target image; and sending the third target image to a display or a memory.

Because brightness and color enhancement may affect sharpness of an image edge, sharpening may not be integrated into the first deep learning network. After brightness enhancement and color enhancement, the image is sharpened based on an actual requirement, so that an image processing effect can be improved.

In a possible implementation, a format of the raw image includes: a Bayer image in an RGGB format, an image in a red, yellow, yellow, blue (RYYB) format, and an image in an XYZW format. The image in the XYZW format represents an image including four color components, and X, Y, Z, and W each represent one color component.

In a possible implementation, the Bayer image in the RGGB format, the image in the RYYB format, and the image in the XYZW format are in a Quad arrangement, and a quantity of pixels included in a minimum repeating unit in the Quad arrangement includes 16, 24, or 32.

In a possible implementation, the raw image is an RYYB image or an image including four different color components. Before the performing at least one of brightness enhancement or color enhancement on the first target image to obtain a second target image, the method further includes: performing color conversion on the first target image to obtain an RGB color image. The performing at least one of brightness enhancement or color enhancement on the first target image to obtain a second target image specifically includes: performing at least one of brightness enhancement or color enhancement on the RGB color image to obtain the second target image.

For example, the image including four different color components includes an RGBIR image or an RGBW image.

In a possible implementation, the functions of the first deep learning network further include image alignment.

When a deep learning network is trained, constructed training data is a plurality of frames of different non-aligned images. In this way, the trained deep learning network has an image alignment capability. Correspondingly, before data is input to the first deep learning network, image registration and motion compensation may not be performed in advance, but instead, N frames of non-aligned raw images are directly input to the network, and the network implements alignment and fusion of the plurality of frames of data.

It should be understood that both image registration and motion compensation are intended for image alignment.

In a possible implementation, the preprocessing further includes image alignment.

In a possible implementation, the preprocessing specifically includes: performing channel splitting and pixel rearrangement on the plurality of frames of raw images, to obtain a plurality of frames of sub-images that respectively belong to M channels, where a quantity of frames of sub-images in each channel is equal to a quantity of frames of the plurality of frames of raw images; and aligning a plurality of frames of sub-images in each channel.

In a possible implementation, the aligning a plurality of frames of sub-images in each channel specifically includes: aligning a plurality of frames of sub-images in a first channel, where the first channel is any one of the M channels; and performing alignment in another channel based on an alignment manner used for the alignment in the first channel.

In this embodiment of this application, channel splitting and pixel rearrangement are first performed, then one channel is selected for alignment, and then alignment in another channel is performed based on a same alignment manner, which simplifies an amount of computation required for image alignment.

For example, a quantity of channels obtained by channel splitting is related to the format of the raw image, and the quantity of channels is equal to a quantity of pixels included in a minimum repeating unit of the raw image.

In a possible implementation, the brightness enhancement or the color enhancement includes at least one of the following: black level correction (BLC), auto-white balance (AWB), lens shading correction (LSC), tone mapping, color mapping, contrast increase, or gamma correction.

In a possible implementation, the preprocessing specifically includes: performing at least one of BLC, AWB, or LSC on the plurality of frames of raw images, to obtain a plurality of frames of first preprocessed raw images; performing channel splitting and pixel rearrangement on the plurality of frames of first preprocessed raw images, to obtain a plurality of frames of sub-images that respectively belong to M channels, where a quantity of frames of sub-images in each channel is equal to a quantity of frames of the plurality of frames of raw images; and aligning a plurality of frames of sub-images in each channel.

In this embodiment of this application, one or more of BLC, AWB, and LSC are first performed on N frames of input raw images, and then processing such as image registration, channel splitting, and pixel rearrangement is performed, which improves an effect of image detail restoration of the deep learning network.

In a possible implementation, a quantity of channels to which sub-images included in the first intermediate image belong is equal to a quantity of pixels included in a minimum repeating unit of the raw image.

In a possible implementation, when the raw image is an image in a red green green blue RGGB format, an image in an RYYB format, or an image in an XYZW format, whose minimum repeating unit includes four pixels, the first intermediate image includes sub-images belonging to four channels. When the raw image is an image in a Quad arrangement whose minimum repeating unit includes 16 pixels, the first intermediate image includes sub-images belonging to 16 channels.

In a possible implementation, the preprocessing further includes estimating at least one of a noise intensity distribution map or a sharpening intensity map of the image. The first deep learning network is specifically configured to implement at least one of the following: controlling noise reduction degrees of different regions of the first intermediate image based on the noise intensity distribution map; and controlling sharpening intensity of different regions of the first intermediate image based on the sharpening intensity map.

In this embodiment of this application, a noise reduction degree of each region may be effectively controlled based on a noise characteristic of each region, or sharpening intensity of each region may be adaptively controlled.

In a possible implementation, the first deep learning network includes: a plurality of residual network convolution blocks, at least one upsampling convolution block, and a second feature fusion block, an output of the second feature convolution block is an output of the first deep learning network, and a quantity of feature channels of the second feature fusion block is 3 or 4.

In a possible implementation, a quantity of upsampling convolution blocks is related to a format of the raw image, a size of the raw image, and a size of the first target image.

In a possible implementation, the first deep learning network further includes a feature extraction convolution block and a first feature fusion block, and outputs of the plurality of residual network convolution blocks are an input of the first feature fusion block.

In a possible implementation, training data of the first deep learning network includes a plurality of frames of low-quality input images and one frame of high-quality target image, and the low-quality input images are obtained by simulation based on the high-quality target image.

In a possible implementation, at least mosaicking and noise addition processing are performed on the high-quality target image to obtain the low-quality input images.

In a possible implementation, the method is applied to the following scenarios: a dark light scenario, a zoom mode, a high dynamic range (HDR) scenario, and a night mode.

In a possible implementation, when the method is applied to an HDR scenario, the plurality of frames of raw images are a plurality of frames of short-exposure raw images, training data of the first deep learning network includes a plurality of frames of short-exposure training images, and the short-exposure training image is obtained based on the following method: performing inverse gamma correction on a properly exposed high-quality image to obtain an inverse gamma correction image; and dividing each pixel value of the inverse gamma correction image by a number to obtain the short-exposure training image.

In a possible implementation, when the method is applied to a dark light scenario, a quantity of frames of input raw images is increased. When the method is applied to a zoom mode, a quantity of upsampling convolution blocks in the first deep learning network is related to a zoom factor.

In a possible implementation, the first deep learning network is a target deep learning network selected from a deep learning network resource pool based on first indication information, and the first indication information is indication information that is selected by a user in an application (APP) interface and that is related to an application scenario; or the first indication information is indication information that is obtained by analyzing a characteristic of a preview image obtained by a camera and that is related to an application scenario; or the first indication information is magnification information carried in the plurality of frames of input raw images.

A second aspect of this application provides an image processing method. The method includes: selecting, based on first indication information, a target deep learning network from a deep learning network resource pool, where the deep learning network resource pool includes a plurality of deep learning networks having different functions; and processing input data based on the target deep learning network to obtain a first output image.

In a possible implementation, the first indication information is indication information that is selected by a user in an application APP interface and that is related to an application scenario; or the first indication information is indication information that is obtained by analyzing a characteristic of a preview image obtained by a camera and that is related to an application scenario; or the first indication information is magnification information carried in a plurality of frames of input raw images.

In a possible implementation, each deep learning network in the deep learning network resource pool includes at least two of the following image processing functions: demosaicing, noise reduction, super-resolution SR reconstruction, defect pixel correction, phase pixel compensation, and sharpening.

In a possible implementation, an application scenario to which the deep learning network in the deep learning network resource pool is applicable includes: a zoom scenario with different magnifications, an HDR scenario, a dark light scenario, or a night mode.

In a possible implementation, when the method is applied to an HDR scenario, the plurality of frames of raw images are a plurality of frames of short-exposure raw images, training data of the target deep learning network includes a plurality of frames of short-exposure training images, and the short-exposure training image is obtained based on the following method: performing inverse gamma correction on a properly exposed high-quality image to obtain an inverse gamma correction image; and dividing each pixel value of the inverse gamma correction image by a number to obtain the short-exposure training image.

In a possible implementation, when the method is applied to a dark light scenario, a quantity of frames of input raw images is increased. When the method is applied to a zoom mode, a quantity of upsampling convolution blocks in the target deep learning network is related to a zoom factor.

A third aspect of this application provides an image processing apparatus. The apparatus includes: a preprocessing module, configured to preprocess a plurality of frames of raw images to obtain a first intermediate image, where the preprocessing includes channel splitting and pixel rearrangement, the first intermediate image includes sub-images belonging to a plurality of channels, and a sub-image of each channel includes only one color component; a first deep learning network, configured to process the first intermediate image to obtain a first target image, where functions of the first deep learning network include DM and noise reduction; and an enhancement module, configured to perform at least one of brightness enhancement or color enhancement on the first target image to obtain a second target image.

In a possible implementation, the functions of the first deep learning network further include super-resolution SR reconstruction, the raw image has a first resolution, the first target image has a second resolution, and the second resolution is greater than the first resolution.

In scenarios with a super-resolution requirement, demosaicing, noise reduction, and SR processing are key processing for detail restoration. If DM and SR processing are first performed, noise of an image is amplified or a noise form of a raw image is damaged, which affects a noise reduction effect. If noise reduction is first performed, a detail loss caused by noise reduction processing cannot be compensated for, which affects an effect of DM, SR, or other processing. In this embodiment of this application, three functions of demosaicing, noise reduction, and SR reconstruction may be simultaneously implemented by training a deep learning network, and there is no processing order when demosaicing, noise reduction, and SR reconstruction related to detail restoration are performed on an image by using the deep learning network, which avoids mutual impact between different processing caused by serial operations of a plurality of modules, and avoids error accumulation caused by the impact.

In a possible implementation, the functions of the first deep learning network further include at least one of defect pixel correction or phase pixel compensation; or the pre-processing further includes at least one of defect pixel correction or phase pixel compensation.

In a possible implementation, the functions of the first deep learning network further include sharpening.

In a possible implementation, the apparatus further includes: a sharpening module, configured to sharpen the second target image to obtain a third target image; and a sending interface, configured to send the third target image to a display or a memory.

In a possible implementation, the raw image is an RYYB image or an image including four different color components. The apparatus further includes: a color conversion module, configured to perform color conversion on the first target image to obtain an RGB color image. The enhancement module is specifically configured to perform at least one of brightness enhancement or color enhancement on the RGB color image to obtain the second target image.

In a possible implementation, the functions of the first deep learning network further include image alignment; or the preprocessing further includes image alignment.

In a possible implementation, the preprocessing further includes image alignment, and the preprocessing module is specifically configured to: perform channel splitting and pixel rearrangement on the plurality of frames of raw images, to obtain a plurality of frames of sub-images that respectively belong to M channels, where a quantity of frames of sub-images in each channel is equal to a quantity of frames of the plurality of frames of raw images; and align a plurality of frames of sub-images in a first channel, where the first channel is any one of the M channels; and perform alignment in another channel based on an alignment manner used for the alignment in the first channel.

In a possible implementation, the enhancement module is specifically configured to implement at least one of the following: BLC, AWB, LSC, tone mapping, color mapping, contrast increase, or gamma correction.

In a possible implementation, the preprocessing module is specifically configured to: perform at least one of black level correction BLC, auto-white balance AWB, or lens shading correction LSC on the plurality of frames of raw images, to obtain a plurality of frames of first preprocessed raw images; perform channel splitting and pixel rearrangement on the plurality of frames of first preprocessed raw images, to obtain a plurality of frames of sub-images that respectively belong to M channels, where a quantity of frames of sub-images in each channel is equal to a quantity of frames of the plurality of frames of raw images; and align a plurality of frames of sub-images in each channel.

In a possible implementation, a format of the raw image includes: a Bayer image in an RGGB format, an image in an RYYB format, and an image in an XYZW format. The image in the XYZW format represents an image including four color components, and X, Y, Z, and W each represent one color component.

In a possible implementation, the Bayer image in the RGGB format, the image in the RYYB format, and the image in the XYZW format are in a Quad arrangement, and a quantity of pixels included in a minimum repeating unit in the Quad arrangement includes 16, 24, or 32.

In a possible implementation, a quantity of channels to which sub-images included in the first intermediate image belong is equal to a quantity of pixels included in a minimum repeating unit of the raw image.

In a possible implementation, when the raw image is an image in a red green green blue RGGB format, an image in an RYYB format, or an image in an XYZW format, whose minimum repeating unit includes four pixels, the first intermediate image includes sub-images belonging to four channels. When the raw image is an image in a Quad arrangement whose minimum repeating unit includes 16 pixels, the first intermediate image includes sub-images belonging to 16 channels. The XYZW image represents an image including four color components, and X, Y, Z, and W each represent one color component.

In a possible implementation, the preprocessing module is further configured to: estimate at least one of a noise intensity distribution map or a sharpening intensity map of the image. The first deep learning network is specifically configured to implement at least one of the following: controlling noise reduction degrees of different regions of the first intermediate image based on the noise intensity distribution map; and controlling sharpening intensity of different regions of the first intermediate image based on the sharpening intensity map.

In a possible implementation, the first deep learning network includes: a plurality of residual network convolution blocks, at least one upsampling convolution block, and a second feature fusion block, an output of the second feature convolution block is an output of the first deep learning network, and a quantity of feature channels of the second feature fusion block is 3 or 4.

In a possible implementation, when the apparatus is applied to an HDR scenario, the plurality of frames of raw images are a plurality of frames of short-exposure raw images. When the apparatus is applied to a dark light scenario, a quantity of frames of input raw images is increased. When the apparatus is applied to a zoom mode, a quantity of upsampling convolution blocks in the first deep learning network is related to a zoom factor.

In a possible implementation, the apparatus further includes a deep learning network resource pool, and the deep learning network resource pool includes a plurality of deep learning networks having different functions.

In a possible implementation, the first deep learning network is a target deep learning network selected from the deep learning network resource pool based on first indication information, and the first indication information is indication information that is selected by a user in an application APP interface and that is related to an application scenario; or the first indication information is indication information that is obtained by analyzing a characteristic of a preview image obtained by a camera and that is related to an application scenario; or the first indication information is magnification information carried in the plurality of frames of input raw images.

A fourth aspect of this application provides a method for training a deep learning network. The method includes: obtaining training data, where the training data includes a plurality of frames of independent low-quality input data and one frame of high-quality target data, and the low-quality input data is obtained by simulation based on the high-quality target data; and training a basic network architecture based on the training data, to obtain a deep learning network having a target function, where the target function is related to a difference between the low-quality input data and the high-quality target data.

In a possible implementation, the obtaining training data includes: obtaining the training data by using an artificial synthesis method.

In a possible implementation, the obtaining training data includes: downloading an open data set through a network, and selecting a high-quality image from the open data set as a high-quality target image; or photographing, by using a high-quality camera, a high-quality image that meets a preset condition, where the preset condition is correspondingly set based on a user requirement; performing inverse gamma correction on the high-quality image to obtain a high-quality image obtained after the inverse gamma correction; and performing downsampling on the high-quality image obtained after the inverse gamma correction, to obtain a high-quality target image.

In a possible implementation, the obtaining training data includes: performing a quality degradation operation on the obtained high-quality target image, to obtain a low-quality input image.

In a possible implementation, the performing a quality degradation operation on the obtained high-quality target image includes: performing at least one of downsampling, Gaussian blur, noise addition, mosaicking, phase pixel addition, or defect pixel addition on the obtained high-quality target image.

In a possible implementation, the quality degradation operation is related to the target function of the deep learning network.

In a possible implementation, when functions of the deep learning network include demosaicing, noise reduction, and SR reconstruction function, the obtaining training data includes: performing downsampling, noise addition, and mosaicking processing on the obtained high-quality target image, to obtain a low-quality input image.

In a possible implementation, when functions of the deep learning network include demosaicing, noise reduction, SR reconstruction, and sharpening functions, the obtaining training data includes: performing downsampling, Gaussian blur, noise addition, and mosaicking processing on the obtained high-quality target image, to obtain a low-quality input image.

In a possible implementation, when functions of the deep learning network include demosaicing, noise reduction, SR reconstruction, sharpening, and defect pixel correction functions, the obtaining training data includes: performing downsampling, Gaussian blur, noise addition, mosaicking processing, and defect pixel addition on the obtained high-quality target image, to obtain a low-quality input image.

In a possible implementation, a plurality of frames of low-quality input images are obtained by separately performing quality degradation operations based on a same frame of high-quality target images, and the plurality of frames of low-quality input images are independently constructed.

In a possible implementation, a loss function of the deep learning network includes an L1 Loss function or an L2 Loss function, or a combination of L1 Loss, structural similarity (SSIM), and adversarial Loss, or a combination of L2 Loss, SSIM, and adversarial Loss.

In a possible implementation, the method for training a deep learning network includes an adaptive moment estimation (Adma) method.

A fifth aspect of this application provides an apparatus for adaptively selecting a deep learning network. The apparatus includes: a receiving interface, an artificial intelligence AI controller, and a deep learning network resource pool. The deep learning network resource pool includes deep learning networks having a plurality of functions. The receiving interface is configured to obtain first indication information. The first indication information is used to indicate a currently applicable application scenario. The artificial intelligence controller is configured to select, from the deep learning network resource pool based on the first indication information, a target deep learning network corresponding to the first indication information.

In a possible implementation, the apparatus further includes: a processor, configured to process an input image based on the target deep learning network, to obtain a first output image.

In a possible implementation, the first indication information is indication information that is selected by a user in an application APP interface and that is related to an application scenario; or the first indication information is indication information that is obtained by analyzing a characteristic of a preview image obtained by a camera and that is related to an application scenario; or the first indication information is magnification information carried in a plurality of frames of input raw images.

In the apparatus for adaptively selecting a deep learning network that is provided in this embodiment of this application, a most appropriate deep learning network may be selected or enabled from the deep learning network resource pool based on a requirement of a user or a characteristic of input data or based on a parameter carried in the input data, to meet requirements of different users or different scenarios to the greatest extent. In addition, an optimal deep learning network can be provided in different scenarios, to provide an optimal image processing effect, which optimizes user experience, improves image processing performance of a mobile terminal or an image processor, and enhances competitiveness.

In a possible implementation, the receiving interface is further configured to receive an input image or a control signal.

In a possible implementation, each deep learning network in the deep learning network resource pool includes at least two of the following image processing functions: demosaicing, noise reduction, super-resolution SR reconstruction, defect pixel correction, phase pixel compensation, or sharpening.

In a possible implementation, an application scenario to which the deep learning network in the deep learning network resource pool is applicable includes: a zoom scenario with different magnifications, an HDR scenario, a dark light scenario, or a night mode.

In a possible implementation, the deep learning network in the deep learning network resource pool is implemented by software code or a software module, and the deep learning network resource pool is stored in a memory.

In a possible implementation, the AI controller reads the target deep learning network from the deep learning network resource pool based on the first indication information, and loads the target deep learning network into the processor. The processor runs the target deep learning network to implement a function corresponding to the target deep learning network.

In a possible implementation, the deep learning network is implemented by an artificial intelligence AI engine, and the AI engine is a hardware module or a dedicated hardware circuit.

In a possible implementation, the apparatus further includes a hardware computing resource. The hardware computing resource includes at least one of addition, subtraction, multiplication, division, an exponential operation, a logarithmic operation, or value comparison.

In a possible implementation, the hardware computing resource may be multiplexed by a plurality of deep learning networks.

In a possible implementation, the apparatus further includes a preprocessing module, configured to perform channel splitting and pixel rearrangement on initially input raw images, to obtain sub-images that respectively belong to a plurality of channels. A sub-image of each channel includes only one color component.

In a possible implementation, the preprocessing module is further configured to: analyze the characteristic of the preview image obtained by the camera, and send a characteristic signal to the AI controller.

In a possible implementation, when the apparatus is applied to an HDR scenario, the receiving interface is configured to obtain a plurality of frames of short-exposure raw images, training data of the target deep learning network includes a plurality of frames of short-exposure training images, and the short-exposure training image is obtained based on the following method: performing inverse gamma correction on a properly exposed high-quality image to obtain an inverse gamma correction image; and dividing each pixel value of the inverse gamma correction image by a number to obtain the short-exposure training image.

In a possible implementation, when the apparatus is applied to a dark light scenario, a quantity of frames of input raw images is increased. When the apparatus is applied to a zoom mode, a quantity of upsampling convolution blocks in the target deep learning network is related to a zoom factor.

A sixth aspect of this application provides an image processing apparatus. The apparatus includes a receiving interface and a processor. The processor runs a first deep learning network. Functions of the first deep learning network include DM and noise reduction. The receiving interface is configured to receive a plurality of frames of raw images obtained by a camera. The processor is configured to invoke software code stored in a memory, to perform the method according to any one of the first aspect or the possible implementations of the first aspect.

A seventh aspect of this application provides an image processing apparatus. The apparatus includes a receiving interface and a processor. The receiving interface is configured to obtain first indication information. The processor is configured to invoke software code stored in a memory, to perform the method according to any one of the second aspect or the possible implementations of the second aspect.

In a possible implementation, the apparatus further includes a memory, configured to store a deep learning network resource pool.

An eighth aspect of this application provides an image processing apparatus. The apparatus includes a receiving interface and a processor. The receiving interface is configured to obtain training data. The training data includes a plurality of frames of independent low-quality input data and one frame of high-quality target data, and the low-quality input data is obtained by simulation based on the high-quality target data. The processor is configured to invoke software code stored in a memory, to perform the method according to any one of the fourth aspect or the possible implementations of the fourth aspect.

A ninth aspect of this application provides a computer-readable storage medium. The computer-readable storage medium stores instructions, and when the instructions are run on a computer or a processor, the computer or the processor is enabled to perform the method according to any one of the first aspect or the possible implementations of the first aspect.

A tenth aspect of this application provides a computer-readable storage medium. The computer-readable storage medium stores instructions. When the instructions are run on a computer or a processor, the computer or the processor is enabled to perform the method according to any one of the second aspect or the possible implementations of the second aspect.

An eleventh aspect of this application provides a computer-readable storage medium. The computer-readable storage medium stores instructions. When the instructions are run on a computer or a processor, the computer or the processor is enabled to perform the method according to any one of the fourth aspect or the possible implementations of the fourth aspect.

A twelfth aspect of this application provides a computer program product including instructions. When the computer program product is run on a computer or a processor, the computer or the processor is enabled to perform the method according to any one of the first aspect or the possible implementations of the first aspect.

A thirteenth aspect of this application provides a computer program product including instructions. When the computer program product is run on a computer or a processor, the computer or the processor is enabled to perform the method according to any one of the second aspect or the possible implementations of the second aspect.

A fourteenth aspect of this application provides a computer program product including instructions. When the computer program product is run on a computer or a processor, the computer or the processor is enabled to perform the method according to any one of the fourth aspect or the possible implementations of the fourth aspect.

BRIEF DESCRIPTION OF DRAWINGS

FIG. 3 is a schematic flowchart of an example image processing method according to an embodiment of this application;

FIG. 4A shows an example Bayer image in an RGGB format according to an embodiment of this application;

FIG. 4B shows an example RGBIR image according to an embodiment of this application;

FIG. 5 shows an example image in a Quad arrangement according to an embodiment of this application;

FIG. 14A is a diagram of a structure of an example feature fusion block 1 according to an embodiment of this application;

FIG. 14B is a diagram of a structure of an example feature fusion block 2 according to an embodiment of this application;

FIG. 15 is a diagram of a structure of an example upsampling convolution block according to an embodiment of this application;

FIG. 16 is a flowchart of an example method for adaptively selecting a deep learning network according to an embodiment of this application.

DESCRIPTION OF EMBODIMENTS

Figure 1:
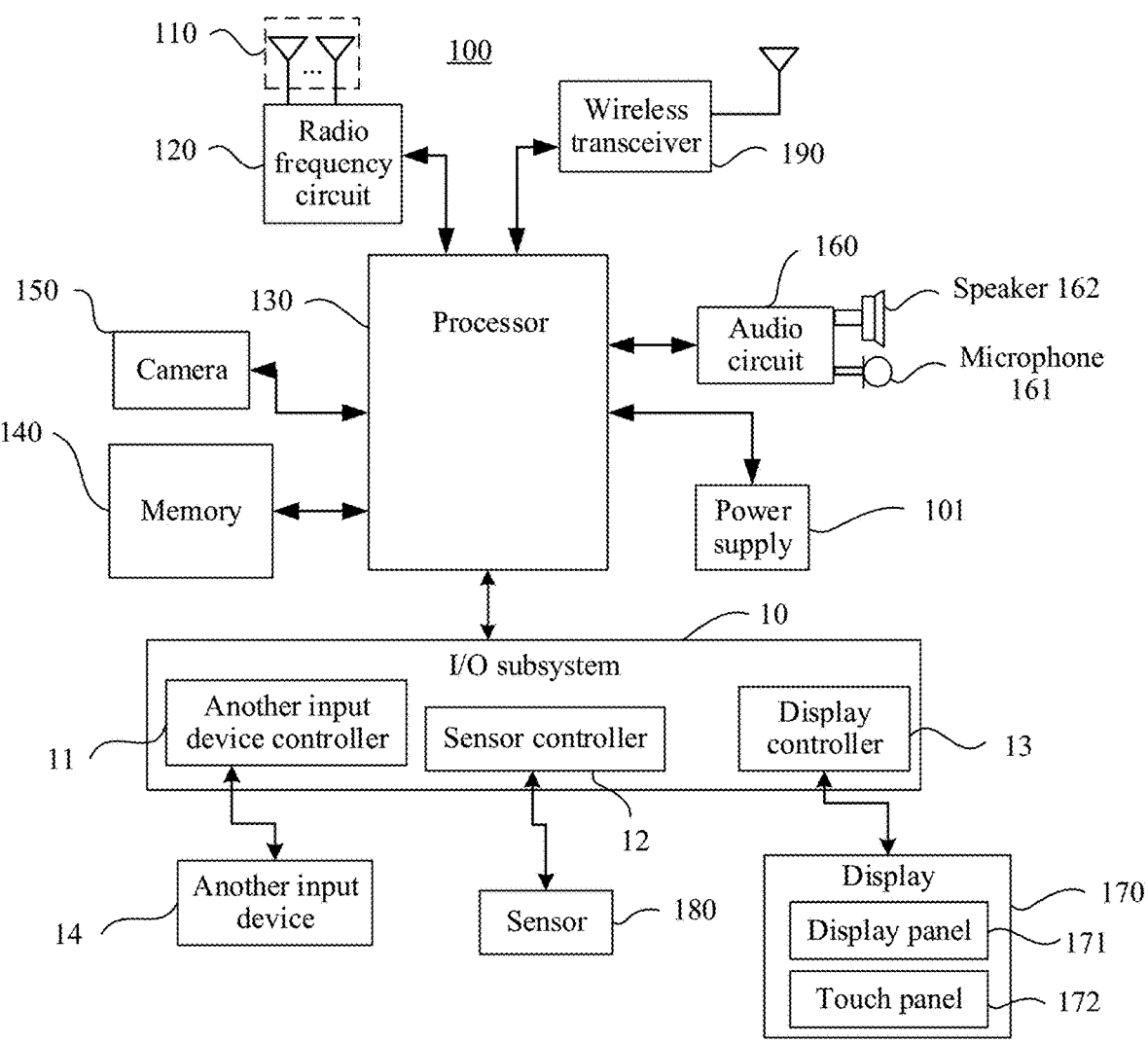
FIG. 1 is a schematic diagram of an architecture of an example terminal according to an embodiment of this application.

In the specification, claims, and accompanying drawings of this application, the terms "first", "second", and the like are intended to distinguish between similar objects but do not necessarily indicate a specific order or sequence. Moreover, the terms "include", "have", and any other variant thereof are intended to cover a non-exclusive inclusion, for example, including a series of steps or units. Methods, systems, products, or devices are not necessarily limited to those expressly listed steps or units, but may include other steps or units that are not expressly listed or that are inherent to such processes, methods, products, or devices.

It should be understood that, in this application, "at least one (item)" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

An image obtained by a camera of a mobile phone is a raw image. Therefore, the image usually needs to be converted into an RGB color image before displayed on a display device. It should be understood that an image format finally displayed on the display device may alternatively be another image format, for example, a YUV color image, a YCbCr color image, or a grayscale image. In the embodiments of this application, an example in which the image finally displayed on the display device is an RGB image is used for description. A series of image processing operations such as detail restoration, color restoration, and brightness restoration need to be performed to convert the raw image to the RGB image. Processing related to detail restoration includes: DM, defect pixel correction, noise reduction, sharpening, SR reconstruction, and the like. It should be understood that SR reconstruction processing needs to be performed only when a user has a zoom requirement. However, operations such as DM, defect pixel correction, and SR reconstruction usually require pixel filling or interpolation, and sharpening requires enhancement and highlighting of edges and textures of the image. If processing such as DM, defect pixel correction, and SR reconstruction is first performed, noise of the image is amplified or a noise form of the raw image is damaged, which affects a noise reduction effect. If noise reduction is first performed, a detail loss caused by noise reduction processing cannot be compensated for, which affects an effect of DM, defect pixel correction, SR reconstruction, or other processing. Therefore, serial operations of a plurality of modules may cause errors to accumulate gradually.

Based on this, the embodiments of this application provide a deep learning-based image processing framework, method, and apparatus, so that a plurality of types of processing related to detail restoration are integrated into one deep learning network, and a plurality of image processing functions may be implemented by using one deep learning network, thereby reducing mutual impact between different image processing, and reducing error accumulation. For example, processing such as demosaicing, noise reduction, and super-resolution reconstruction may be integrated into a deep learning network. Optionally, processing such as defect pixel correction and sharpening may also be integrated into the deep learning network. The image processing framework provided in the embodiments of this application greatly improves a resolution, a definition, and a visual effect of an image, and suppresses phenomena such as moire, halos, and overshoot, which is applicable to various photographing scenarios such as zoom, HDR, and night modes. Further, in the embodiments of this application, a plurality of frames of consecutive images are used as an input, so that valid information of the plurality of frames of images is fused, to better restore image details.

The image processing framework and the image processing method provided in the embodiments of this application are applicable to various terminals. Correspondingly, the image processing apparatus provided in the embodiments of this application may be terminal products in a plurality of forms, such as a smartphone, a tablet computer, smart glasses, a wearable device, and a camera. FIG. 1 is a schematic diagram of an architecture of an example terminal 100 according to an embodiment of this application. The terminal 100 may include an antenna system 110, a radio frequency (RF) circuit 120, a processor 130, a memory 140, a camera 150, an audio circuit 160, a display 170, one or more sensors 180, a wireless transceiver 190, and the like.

The antenna system 110 may be one or more antennas, or may be an antenna array including a plurality of antennas. The radio frequency circuit 120 may include one or more analog radio frequency transceivers, the radio frequency circuit 120 may further include one or more digital radio frequency transceivers, and the RF circuit 120 is coupled to the antenna system 110. It should be understood that, in embodiments of this application, coupling is a mutual connection in a specific manner, including a direct connection or an indirect connection by using another device, for example, a connection through various interfaces, transmission lines, or buses. The radio frequency circuit 120 may be configured for various cellular wireless communications.

The processor 130 may include a communications processor. The communications processor may be configured to control the RF circuit 120 to receive and send signals by using the antenna system 110. The signals may be voice signals, media signals, or control signals. The processor 130 may include various general-purpose processing devices, for example, may be a general-purpose central processing unit (CPU), a system on chip (SOC), a processor integrated on a SOC, a separate processor chip, or a controller. The processor 130 may further include a dedicated processing device, such as an application specific integrated circuit (ASIC), a field programmable gate array (FPGA), a digital signal processor (DSP), a dedicated video or graphics processor, a graphics processing unit (GPU), and a neural-network processing unit (NPU). The processor 130 may be a processor group including a plurality of processors, and the plurality of processors are coupled to each other through one or more buses. The processor may include an analog-to-digital converter (ADC) and a digital-to-analog converter (DAC) to implement a signal connection between different components of the apparatus. The processor 130 is configured to process image, audio, video, and other media signals.

The memory 140 is coupled to the processor 130. Specifically, the memory 140 may be coupled to the processor 130 by using one or more memory controllers. The memory 140 may be configured to store computer program instructions, including a computer operating system (OS) and various user application programs. The memory 140 may be further configured to store user data, such as calendar information, contact information, obtained image information, audio information, or other media files. The processor 130 may read a computer program instruction or user data from the memory 140, or store a computer program instruction or user data in the memory 140, to implement a related processing function. The memory 140 may be a power failure nonvolatile memory, for example, an embedded multimedia card (EMMC), a universal flash storage (UFS), a read-only memory (ROM), or another type of static storage device that may store static information or instructions, or may be a power failure volatile memory, for example, a random access memory (RAM), or another type of dynamic storage device that may store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other computer-readable storage media that can be configured to carry or store program code in a structure form of instructions or data and that can be accessed by a computer. No limitation is set thereto. The memory 140 may exist independently, or the memory 140 may be integrated with the processor 130.

The camera 150 is configured to collect an image or a video, and may be triggered by an application instruction, to implement a picture photographing function or a video recording function, for example, obtain an image or a video in any scenario through photographing. The camera may include components such as an imaging lens, a light filter, and an image sensor. Light emitted or reflected by an object enters the imaging lens, passes through the light filter, and finally converges on the image sensor. The imaging lens is mainly configured to converge light emitted or reflected by all objects (which may be referred to as to-be-photographed scenarios or target scenarios, or may be understood as scenario images that a user expects to photograph) in a photographing angle of view to form an image. The light filter is mainly configured to filter out a redundant lightwave (for example, a lightwave other than a visible light, for example, an infrared lightwave) in the light. The image sensor is mainly configured to: perform optical-to-electrical conversion on a received optical signal to convert the received optical signal into an electrical signal, and input the electrical signal into the processor 130 for subsequent processing. The camera may be located in the front of the terminal device or on a back of the terminal device. A specific quantity of cameras and arrangement of the cameras may be flexibly determined based on a requirement of a designer or a policy of a manufacturer. This is not limited in this application.

The audio circuit 160 is coupled to the processor 130. The audio circuit 160 may include a microphone 161 and a speaker 162. The microphone 161 may receive a sound input from the outside, and the speaker 162 may play audio data. It should be understood that the terminal 100 may have one or more microphones and one or more headsets. Quantities of microphones and headsets are not limited in this embodiment of this application.

The display 170 is configured to display information input by the user and various menus of information provided to the user. These menus are associated with specific modules or functions inside. The display 170 may further receive a user input, for example, receive enabling, disabling, or other control information. Specifically, the display 170 may include a display panel 171 and a touch panel 172. The display panel 171 may be configured by using a liquid-crystal display (LCD), an organic light-emitting diode (OLED), a light-emitting diode (LED) display device, a cathode-ray tube (CRT), or the like. The touch panel 172, or referred to as a touchscreen, a touch-sensitive screen, or the like, may collect a touch or non-touch operation performed by a user on or near the touch panel 172 (for example, an operation performed by the user on or near the touch panel 172 by using any proper object or accessory such as a finger or a stylus, and a somatosensory operation, where the operation includes a single-point control operation, a multi-point control operation, and other types of operations), and drive a corresponding connecting apparatus based on a preset program. Optionally, the touch panel 172 may include two parts: a touch detection apparatus and a touch controller. The touch detection apparatus detects a signal generated by a touch operation of the user, and transfers the signal to the touch controller. The touch controller receives touch information from the touch detection apparatus, converts the touch information into information that can be processed by the processor 130, and sends the information to the processor 130. Moreover, the touch controller can receive and execute a command sent by the processor 130. Further, the touch panel 172 may cover the display panel 171, and the user may perform, based on content displayed on the display panel 171, an operation on or near the touch panel 172 covering the display panel 171. The displayed content includes, but is not limited to, a soft keyboard, a virtual mouse, a virtual button, an icon, or the like. After detecting the operation on or near the touch panel 172, the touch panel 172 transfers the operation to the processor 130 by using an I/O subsystem 10, to determine a user input. Then, the processor 130 provides a corresponding visual output on the display panel 171 based on the user input by using the I/O subsystem 10. Although the touch panel 172 and the display panel 171 are used as two independent components to implement input and input functions of the terminal 100 in FIG. 1, the touch panel 172 and the display panel 171 may be integrated to implement the input and output functions of the terminal 100 in some embodiments.

The sensor 180 may include an image sensor, a motion sensor, a proximity sensor, an ambient noise sensor, a sound sensor, an accelerometer, a temperature sensor, a gyroscope, or other types of sensors, and various combinations thereof. The processor 130 drives the sensor 180 by using a sensor controller 12 in the I/O subsystem 10 to receive various information such as an audio signal, an image signal, and motion information. The sensor 180 transmits the received information to the processor 130 for processing.

The wireless transceiver 190 may provide a wireless connection capability to another device. The another device may be a peripheral device such as a wireless headset, a Bluetooth headset, a wireless mouse, or a wireless keyboard, or may be a wireless network, such as a Wi-Fi network, a wireless personal area network (WPAN), or another wireless local area network (WLAN). The wireless transceiver 190 may be a Bluetooth compatible transceiver, configured to wirelessly couple the processor 130 to a peripheral device such as a Bluetooth headset or a wireless mouse. Alternatively, the wireless transceiver 190 may be a Wi-Fi compatible transceiver, configured to wirelessly couple the processor 130 to a wireless network or another device.

The terminal 100 may further include other input devices 14 coupled to the processor 130 to receive various user inputs, for example, receive input numbers, names, addresses, and media selections. The other input devices 14 may include a keyboard, a physical button (a press button, a rocker button, or the like), a dial, a slide switch, a joystick, a click wheel, an optical mouse (the optical mouse is a touch-sensitive surface that does not display a visual output, or an extension of a touch-sensitive surface formed by a touchscreen), or the like.

The terminal 100 may further include the I/O subsystem 10. The I/O subsystem 10 may include a controller 11 for other input devices, configured to receive signals from the other input devices 14 or send control or drive information of the processor 130 to the other input devices 14. The I/O subsystem 10 may further include the sensor controller 12 and a display controller 13, respectively configured to implement data and control information exchange between the sensor 180 and the processor 130 and between the display 170 and the processor 130.

The terminal 100 may further include a power supply 101, to supply power to other components of the terminal 100 that include 110 to 190. The power supply may be a rechargeable or non-chargeable lithium ion battery or nickel metal hydrogen battery. Further, when the power supply 101 is a rechargeable battery, the power supply 101 may be coupled to the processor 130 by using a power management system, to implement functions such as charging, discharging, and power consumption adjustment management by using the power management system.

It should be understood that the terminal 100 in FIG. 1 is merely an example, and a specific form of the terminal 100 is not limited. The terminal 100 may further include another component that is not shown in FIG. 1 and that may be added at present or in the future.

In an optional solution, the RF circuit 120, the processor 130, and the memory 140 may be partially or all integrated on one chip, or may be three chips independent of each other. The RF circuit 120, the processor 130, and the memory 140 may include one or more integrated circuits disposed on a printed circuit board (PCB).

Figure 2:
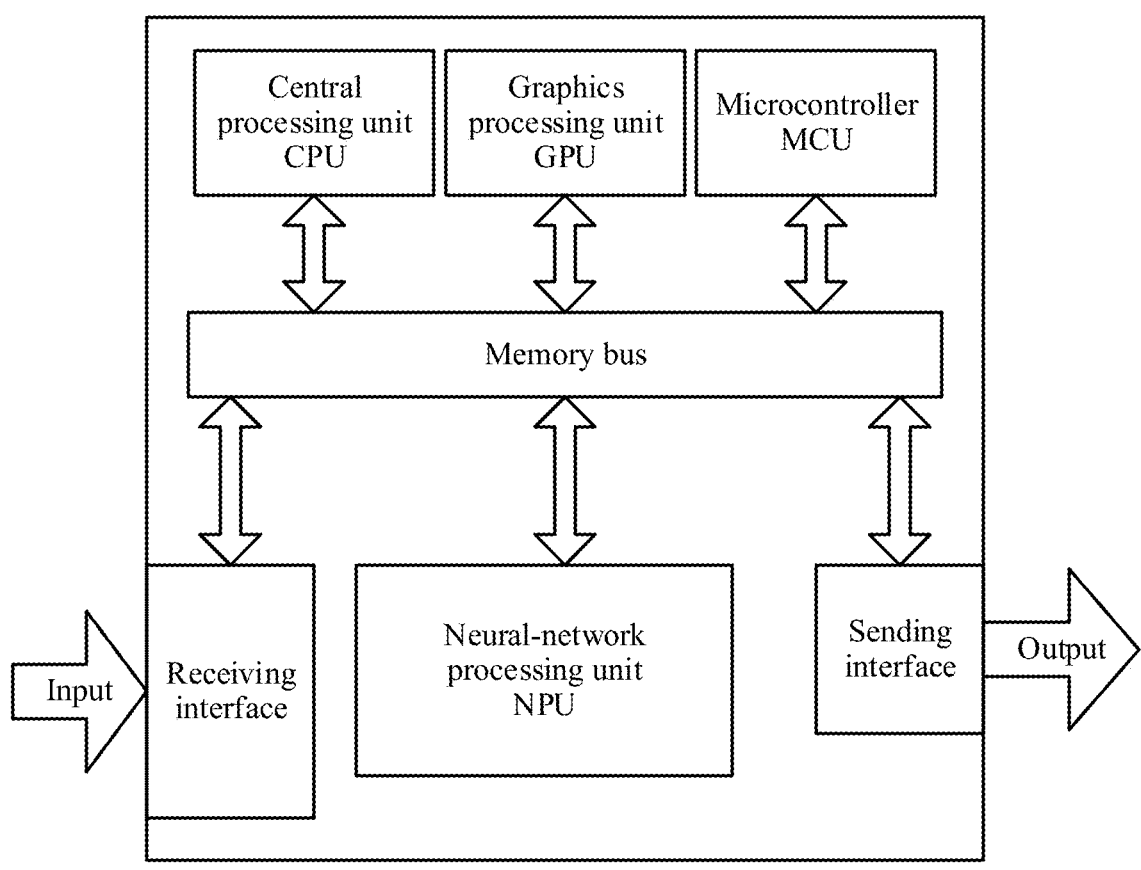
FIG. 2 is a diagram of a hardware architecture of an example image processing apparatus according to an embodiment of this application.

FIG. 2 is a diagram of a hardware architecture of an example image processing apparatus according to an embodiment of this application. The image processing apparatus 200 may be, for example, a processor chip. For example, the hardware architecture diagram shown in FIG. 2 may be an example architecture diagram of the processor 130 in FIG. 1. The image processing method and the image processing framework provided in the embodiments of this application may be applied to the processor chip.

Referring to FIG. 2, the apparatus 200 includes: at least one CPU, a memory, a microcontroller unit (MCU), a GPU, an NPU, a memory bus, a receiving interface, a sending interface, and the like. Although not shown in FIG. 2, the apparatus 200 may further include an application processor (AP), a decoder, and a dedicated video or image processor.

The parts of the apparatus 200 are coupled by using a connector. For example, the connector includes various interfaces, transmission lines, buses, or the like. These interfaces are generally electrical communications interfaces, but may alternatively be mechanical interfaces or interfaces in other forms. This is not limited in this embodiment.

Optionally, the CPU may be a single-core processor (single-CPU) or a multi-core processor (multi-CPU). Optionally, the CPU may be a processor group including a plurality of processors, and the plurality of processors are coupled to each other by using one or more buses. The receiving interface may be a data input interface of the processor chip. In an optional case, the receiving interface and the sending interface may be a high definition multimedia interface (HDMI), a V-By-One interface, an embedded display port (eDP), a mobile industry processor interface (MIPI), a Display Port (DP), or the like. For the memory, refer to the foregoing description of the memory 140 part.

In an optional case, the foregoing parts are integrated into a same chip. In another optional case, the CPU, the GPU, the decoder, the receiving interface, and the sending interface are integrated into one chip, and each part in the chip accesses an external memory by using a bus. The dedicated video/graphics processor and the CPU may be integrated on a same chip, or may exist as independent processor chips. For example, the dedicated video/graphics processor may be a dedicated ISP. In an optional case, the NPU may also be an independent processor chip. The NPU is configured to implement various operations related to a neural network or deep learning. Optionally, the image processing method and the image processing framework provided in the embodiments of this application may be implemented by the GPU or the NPU, or may be implemented by the dedicated graphics processor.

A chip in embodiments of this application is a system manufactured on a same semiconductor substrate by using an integrated circuit technology, and is also referred to as a semiconductor chip. The chip may be a set of integrated circuits formed on the substrate (which is usually made of a semiconductor material such as silicon) by using the integrated circuit technology, and an outer layer of the chip is usually packaged with a semiconductor packaging material. The integrated circuit may include various function components. Each type of function component includes a logic gate circuit, a metal oxide semiconductor (MOS) transistor, or a transistor such as a bipolar transistor or a diode, and may also include another part such as a capacitor, a resistor, or an inductor. Each function component may independently operate or operate under action of necessary driver software, and may implement various functions such as communication, operation, or storage.

FIG. 3 is a schematic flowchart of an image processing method according to an embodiment of this application.

The image processing method includes the following steps:

301: Obtain N frames of raw images.

Figures 4A, 4B, 5:
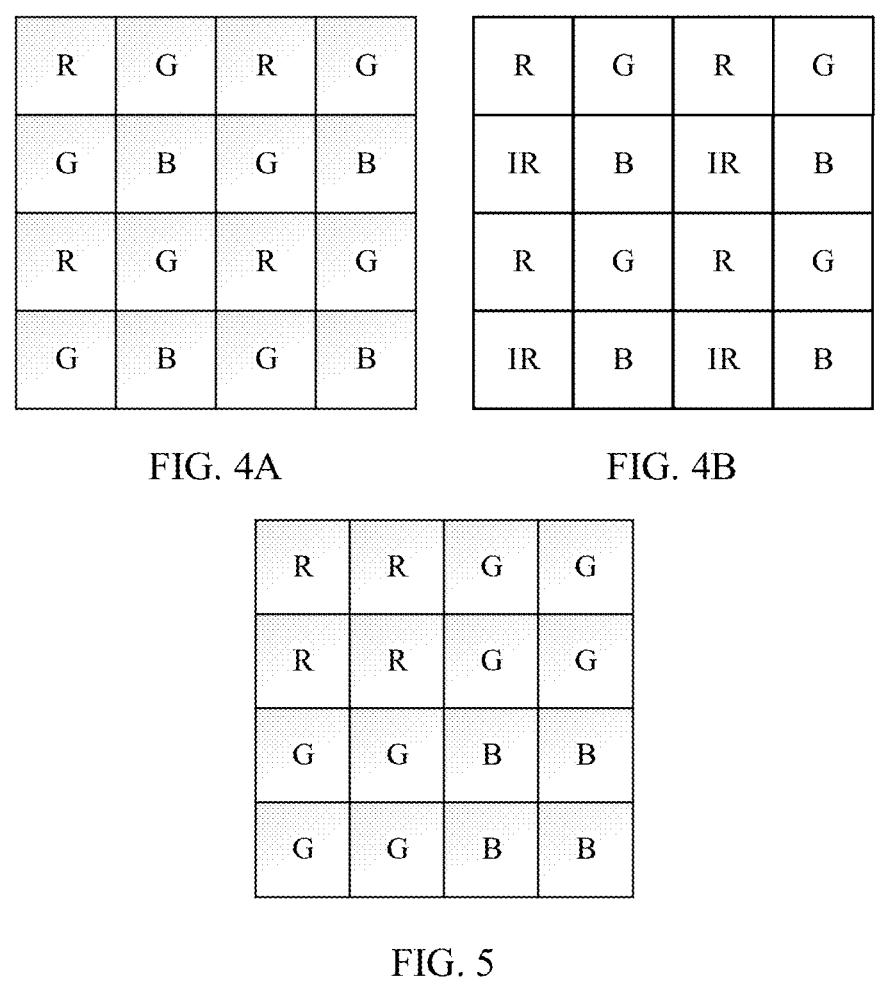

The raw image is an unprocessed raw image obtained by using a camera, and each pixel of the raw image represents intensity of only one color. For example, the camera may be a complementary metal-oxide semiconductor (CMOS) sensor or a charge-coupled device (CCD) sensor. A color format of the raw image is determined by a color filter array (CFA) placed in front of the sensor. The raw image may be an image obtained in various CFA formats. For example, the raw image may be a Bayer image in an RGGB format. FIG. 4A shows a Bayer image in the RGGB format. In FIG. 4A, each box represents one pixel, R represents a red pixel, G represents a green pixel, and B represents a blue pixel. A minimum repeating unit of the Bayer image is a 2×2 array. The 2×2 array unit includes four pixels: R, G, G, and B. Optionally, the raw image may alternatively be an image in an RYYB format or an image in an XYZW format, for example, a Bayer image in a red green blue infrared (RG-BIR) arrangement, or a Bayer image in a red green blue white (RGBW) arrangement. The XYZW format represents an image format including four components, and X, Y, Z, and W each represent one component. FIG. 4B shows an example RGBIR image. The raw image may alternatively be an image in a Quad arrangement shown in FIG. 5. A length and a width of the input raw image are respectively h and w. N is a positive integer. For example, N may be 4 or 6. Optionally, the N frames of images are N frames of consecutively obtained images, and time intervals between the N frames of consecutively obtained images may be equal or unequal. Optionally, the N frames of images may alternatively be not consecutive, for example, may be the first, third, fifth, and seventh frames of images in a plurality of frames of consecutively obtained images.

It should be understood that, if image processing is performed by the processor chip shown in FIG. 2, the raw image may be obtained by using the receiving interface, and the raw image is photographed by a camera of a terminal. If image processing is performed by the terminal shown in FIG. 1, the raw image may be obtained by using the camera 150.

302: Preprocess the N frames of input raw images to obtain a first intermediate image.

Figure 6A:
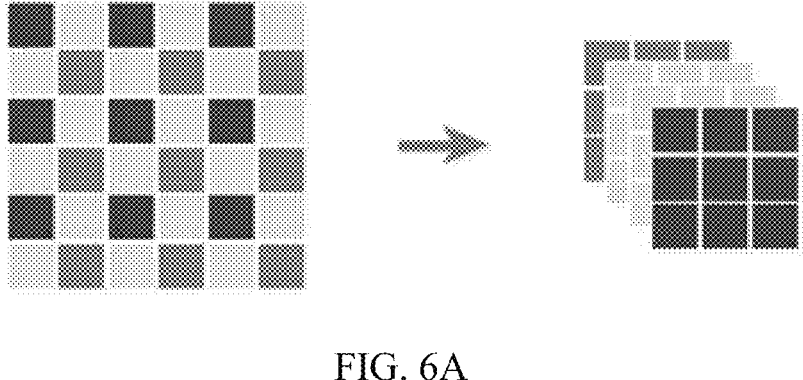
FIG. 6A is a schematic diagram of an example of performing channel splitting and pixel rearrangement on a Bayer image in an RGGB format to obtain a first intermediate image according to an embodiment of this application.
Figure 6B:
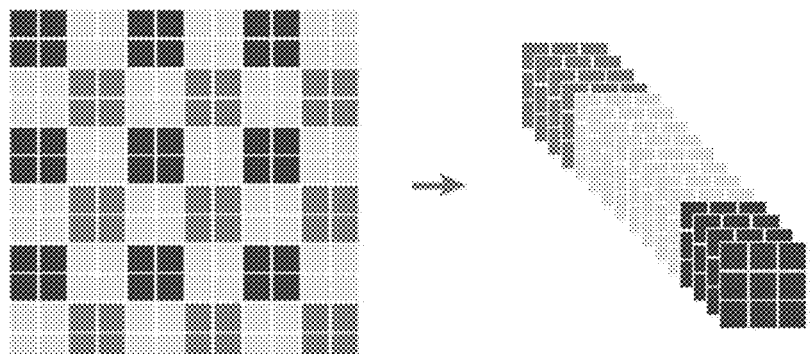
FIG. 6B is a schematic diagram of an example of performing channel splitting and pixel rearrangement on an image in a Quad arrangement to obtain a first intermediate image according to an embodiment of this application.

For example, the preprocessing includes channel splitting and pixel rearrangement, the first intermediate image includes sub-images belonging to a plurality of channels, and each sub-image includes only one color component. FIG. 6A is a schematic diagram of performing channel splitting and pixel rearrangement on a Bayer image in an RGGB format to obtain a first intermediate image. A minimum repeating unit of the Bayer image in the RGGB format includes four pixels: R, G, G, and B. Four pixels R, G, G, and B in each minimum repeating unit in the raw image are split and rearranged respectively to obtain four different sub-images. One frame of w*h raw image is split into four frames of w/2*h/2 sub-images, and N frames of w*h raw images are split into 4*N frames of w/2*h/2 sub-images. That is, when the input raw images are N frames of Bayer images in the RGGB format, the first intermediate image includes 4*N frames of w/2*h/2 sub-images that respectively belong to four channels. Each channel includes N frames of sub-images. Each frame of sub-image includes only one color component. Specifically, the 4*N frames of sub-images include N frames of R sub-images belonging to a first channel, N frames of G sub-images belonging to a second channel, N frames of G sub-images belonging to a third channel, and N frames of B sub-images belonging to a fourth channel. It should be understood that when the input raw images are RYYB images or XYZW images, the first intermediate image also includes sub-images that respectively belong to four channels, and if a quantity of frames of input raw images is N, a quantity of sub-images included in the first intermediate image is 4*N frames, and a quantity of sub-images included in each channel is equal to the quantity of frames of raw images, which is equal to N. FIG. 6B is a schematic diagram of performing channel splitting and pixel rearrangement on an image in a Quad arrangement to obtain a first intermediate image. A minimum repeating unit of the image in the Quad arrangement includes a total of 16 pixels, which are four R pixels, four G pixels, four G pixels, and four pixels B. After channel splitting and pixel rearrangement are performed on one frame of w*h image in the Quad arrangement, 16 frames of w/4*h/4 sub-images are obtained. One frame of sub-image belongs to one channel. N frames of images in the Quad arrangement are split into 16*N frames of sub-images. That is, when the input raw images are N frames of images in the Quad arrangement whose minimum repeating unit includes 16 pixels, the first intermediate image includes 16*N frames of sub-images that respectively belong to 16 channels. Each channel includes N frames of sub-images. Each frame of sub-image includes only one color component. In an optional solution, quantities of R, G, G, and B pixels included in the minimum repeating unit of the image in the Quad arrangement may alternatively each be 6, 8, or another quantity. Correspondingly, the first intermediate image includes sub-images that respectively belong to 24 channels, or sub-images that respectively belong to 32 channels. It should be understood that a quantity of channels of the first intermediate image is equal to a quantity of pixels included in a minimum repeating unit of the raw image.

For example, the preprocessing may further include image registration and motion compensation. The image registration may remove a change between the plurality of frames of images that is caused by camera motion. However, if there is a moving object in a photographed scenario, after image registration is completed, a background region is aligned between the plurality of frames of images, but the moving object is non-aligned, and the non-alignment caused by object motion requires compensation. For example, one of the N frames of images is selected as a reference frame. For example, the first frame of image may be used as a reference frame, and image registration is performed on all other frames of images by using the reference frame, to implement alignment of the plurality of frames of images. In an optional case, if there is a motion region between the N frames of raw images, after image registration, the motion region needs to be further compensated based on the reference frame, so as to obtain N frames of aligned images. It should be understood that both image registration and motion compensation are intended for alignment of the plurality of frames of images. It should be understood that in some cases, it is difficult to truly achieve full alignment of the plurality of frames of images.

In an optional case, channel splitting is first performed on the raw images to obtain sub-images of a plurality of channels, alignment is first performed in one of the channels, and then alignment is performed in another channel based on a same manner. In another optional case, image registration and motion compensation may be first performed to implement alignment of the plurality of frames of raw images, and then channel splitting is performed on the raw images.

In an optional solution, when a deep learning network is trained, constructed training data is a plurality of frames of different non-aligned images. In this way, the trained deep learning network has a capability of fusing a plurality of frames of non-aligned images. Optionally, before data is input to a first deep learning network, image registration and motion compensation may not be performed in advance, but instead, a plurality of frames of non-aligned sub-images obtained by splitting are directly input to the network, and the network implements alignment and fusion of the plurality of frames of data.

In an optional solution, the preprocessing may include estimating intensity of noise in each region of the image and obtaining a noise intensity distribution map. The noise intensity distribution map may reflect noise intensity distribution in different regions. The noise intensity distribution map and the aligned and split image data are input to the first deep learning network together, so that the first deep learning network may adaptively control a noise reduction degree of each region based on a noise characteristic of each region.

In an optional solution, a sharpening intensity map may be obtained during preprocessing. The sharpening intensity map includes sharpening intensity for different regions. The sharpening intensity map and the aligned and split image data are input to the first deep learning network together, so that the first deep learning network may adaptively control sharpening intensity of each region.

In an optional solution, a noise intensity distribution map and a sharpening intensity map may be obtained during preprocessing, and the noise intensity distribution map, the sharpening intensity map, and the to-be-processed image data are input to the first deep learning network together.

303: Process the first intermediate image based on the first deep learning network to obtain a first target image.

The first deep learning network may implement at least two image processing functions related to detail restoration, and the first target image may be an RGB color image with abundant details and relatively low noise. In an optional case, when the input raw images are in the RYYB format, the first target image obtained after processing by the first deep learning network is a color image of three channels RYB. When the input raw images are in the XYZW format, the first target image obtained after processing by the first deep learning network is a color image of four channels XYZW. In both cases, the image processing method further includes: performing color conversion on the first target image to obtain an RGB color image.

For example, the first deep learning network may include demosaicing and noise reduction functions, or it may be described as follows: after the input image is processed by the deep learning network, it is equivalent to that demosaicing processing and noise reduction processing are implemented. Demosaicing and noise reduction are key processing for detail restoration, and no matter whether demosaicing processing or noise reduction processing is first performed, an effect of image detail restoration is affected. Therefore, in this embodiment of this application, demosaicing processing and noise reduction processing are integrated into a same deep learning network, which avoids error accumulation caused by serial processing of the two operations. Correspondingly, the first target image output by the first deep learning network is an RGB color image on which noise reduction and demosaicing are performed.

In an optional case, the first deep learning network may include demosaicing, noise reduction, and SR reconstruction functions, or it may be described as follows: after the input image is processed by the deep learning network, it is equivalent to that demosaicing processing, noise reduction processing, and SR reconstruction processing are implemented. The SR reconstruction means obtaining a high-resolution image by using a low-resolution image. For example, one frame of high-resolution image may be obtained based on one frame of low-resolution image, or one frame of high-resolution image may be obtained based on a plurality of frames of low-resolution images. In scenarios with a super-resolution requirement, demosaicing, noise reduction, and SR reconstruction processing are key processing for detail restoration. In addition, as described above, if DM and SR reconstruction processing are first performed, noise of an image is amplified or a noise form of a raw image is damaged, which affects a noise reduction effect. If noise reduction is first performed, a detail loss caused by noise reduction processing cannot be compensated for, which affects an effect of DM, SR reconstruction, or other processing. In this embodiment of this application, a deep learning network that can implement DM, SR reconstruction, and noise reduction is obtained by training, and because the plurality of functions are implemented by the same deep learning network, there is no processing order, which avoids mutual impact between different processing caused by serial operations of a plurality of modules, and avoids error accumulation caused by the impact. Correspondingly, the first target image output by the first deep learning network is an RGB color image on which noise reduction, demosaicing, and SR reconstruction processing are performed. A resolution of an image obtained after the SR reconstruction is higher than a resolution of an image before the SR reconstruction.

For example, the first deep learning network may include demosaicing, noise reduction, SR reconstruction, and defect pixel correction functions. It should be understood that a defect pixel may refer to an invalid or incorrect pixel that is in an image and that is caused by a defect of a photosensitive component, or an imperfection point in the image, for example, a point much brighter than a surrounding region, a point much darker than a surrounding region, a point that is not particularly brighter or darker than a surrounding region but has an incorrect pixel value.

For example, the first deep learning network may include demosaicing, noise reduction, SR reconstruction, defect pixel correction, and sharpening functions.

For example, the first deep learning network may include demosaicing, noise reduction, SR reconstruction, defect pixel correction, sharpening, and phase pixel compensation functions. It should be understood that a phase pixel is a pixel that includes phase information but does not include valid pixel information. During display, a pixel value corresponding to the phase pixel needs to be obtained based on pixels around the phase pixel.

For example, the first deep learning network may include demosaicing, noise reduction, and defect pixel correction functions.

For example, the first deep learning network may include demosaicing, noise reduction, and sharpening functions.

For example, the first deep learning network may include demosaicing, noise reduction, defect pixel correction, and sharpening functions.

For example, the first deep learning network may include demosaicing, noise reduction, defect pixel correction, sharpening, and phase pixel compensation functions.

In an optional solution, because a position of a phase pixel is basically fixed, and a defect pixel correction algorithm is relatively mature, a defect pixel and a phase pixel may be marked on a production line, and then defect pixel correction and phase pixel compensation are performed based on positions of the defect pixel and the phase pixel that are marked on the production line. Then, an image without defect pixels and phase pixels is input to the first deep learning network for detail reconstruction. In an optional solution, position detection of the defect pixel and the phase pixel, as well as the defect pixel correction and the phase pixel compensation, may be implemented in preprocessing.

In an optional case, the first deep learning network runs in the NPU or the GPU in FIG. 2. Optionally, the deep learning network may alternatively partially run in the NPU and partially run in the GPU. Optionally, running of the first deep learning network may be related to a control function of the CPU or the MCU.

304: Perform at least one of brightness enhancement or color enhancement on the first target image to obtain a second target image.

It should be understood that after the first deep learning network processes the input image, at least brightness enhancement or color enhancement needs to be further performed on the first target image, or brightness enhancement and color enhancement need to be performed on the first target image. For example, the brightness enhancement or color enhancement processing includes at least one of the following: BLC, AWB, LSC, tone mapping, color mapping, contrast increase, gamma correction, or the like. Optionally, the brightness enhancement and the color enhancement may be implemented by using serial modules, or may be implemented by using a neural network.

In an optional solution, one or more of BLC, AWB, and LSC may be implemented in preprocessing. For example, one or more of BLC, AWB, and LSC are first performed on the N frames of input raw images, and then processing such as image registration, channel splitting, and pixel rearrangement is performed. In this case, the preprocessing specifically includes: performing at least one of black level correction BLC, auto-white balance AWB, or lens shading correction LSC on the plurality of frames of raw images, to obtain a plurality of frames of first preprocessed raw images; performing channel splitting and pixel rearrangement on the plurality of frames of first preprocessed raw images, to obtain a plurality of frames of sub-images that respectively belong to M channels, where a quantity of frames of sub-images in each channel is equal to a quantity of frames of the plurality of frames of raw images; and aligning a plurality of frames of sub-images in each channel.

In an optional solution, because brightness and color enhancement may affect sharpness of an image edge, sharpening may not be integrated into the first deep learning network. After brightness enhancement and color enhancement, the image is sharpened based on an actual requirement.

Optionally, the image processing method further includes:

305: Send the second target image to a display for display or store the second target image in a storage unit.

Optionally, the second target image may be encoded or compressed before stored in the storage unit. Optionally, the second target image may alternatively be sent to another device. A destination of the obtained second target image is not limited in this embodiment of this application.

In this embodiment of this application, processing related to detail restoration is integrated into the same deep learning network, which avoids mutual impact between different processing when a plurality of types of processing are serially performed, reduces error accumulation caused by the mutual impact between different processing, and improves a resolution and a definition of an image. Further, in this embodiment of this application, the N frames of raw images are simultaneously input, so that valid information of the plurality of frames of images is fused, which helps better restore image details. In addition, because there may be differences between the plurality of frames of images, before the images are input to the deep learning network for detail restoration, preprocessing such as channel splitting, pixel rearrangement, and alignment is first performed on the N frames of images, which improves a processing effect of the deep learning network.

Figure 7:
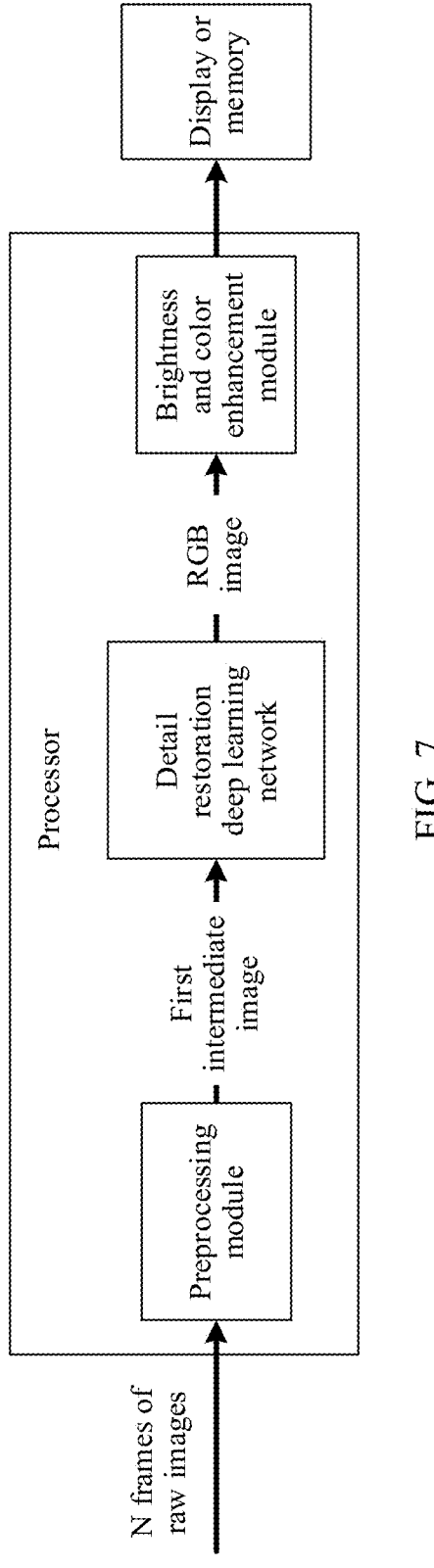
FIG. 7 shows an example image processing framework according to an embodiment of this application.

FIG. 7 shows an image processing framework according to an embodiment of this application. The image processing framework shown in FIG. 7 may be configured to implement the image processing method shown in FIG. 3.

The image processing framework includes: a preprocessing module, a detail restoration deep learning network, and a brightness and color enhancement module. Optionally, the image processing framework further includes a display and a memory. The preprocessing module, the detail restoration deep learning network, and the brightness and color enhancement module are implemented by a processor. These modules may be implemented by a software module on the processor, or a dedicated hardware circuit on the processor, or a combination of software and hardware. For example, the preprocessing module, the brightness and color enhancement module are implemented by a GPU, an ISP, or a CPU in the processor, and the deep learning network is implemented by an NPU in the processor. Optionally, the deep learning network may alternatively be implemented by a GPU and an NPU. In a possible solution, the preprocessing module and the deep learning network are implemented by an application processor (AP), and the brightness and color enhancement module is implemented by a display driver integrated circuit (DDIC). The DDIC is configured to drive the display. It should be understood that the brightness and color enhancement module shown in FIG. 7 may also be referred to as an enhancement module, and the enhancement module is configured to implement at least one of brightness enhancement or color enhancement.

An input of the image processing framework is N frames of raw images, and the N frames of raw images may be Bayer images in an RGGB format, images in a Quad arrangement, or other raw images in a CFA format including three color components: R, G, and B.

The preprocessing module is configured to preprocess the N frames of input raw images to obtain a first intermediate image. Refer to the description of the 302 part in the foregoing method embodiment for details, which are not described herein again. It should be understood that if the input is N frames of Bayer images in the RGGB format, the first intermediate image output by the preprocessing module is 4N frames of sub-images, the 4N frames of images belong to four channels, and a sub-image of each channel includes only one color component. Specifically, the 4N frames of sub-images include N frames of sub-images including an R component, N frames of sub-images including a G component, N frames of sub-images including a G component, and N frames of sub-images including a B component, and a sub-image of each component belongs to one channel. If the input is N frames of images in the Quad arrangement, the first intermediate image output by the preprocessing module is 16N frames of sub-images, the 16N frames of images belong to 16 channels, and a sub-image of each channel includes only one color component. Specifically, because a minimum repeating unit of an image in the Quad arrangement includes four R components, four G components, four G components, and four B components, correspondingly, the 16N frames of sub-images include 4N frames of sub-images including an R component, 4N frames of sub-images including a G component, 4N frames of sub-images including a G component, and 4N frames of sub-images including a B component, and a sub-image of each component belongs to one channel. It should be understood that a quantity of frames of the first intermediate image output by the preprocessing module is related to a quantity of pixels included in a minimum repeating unit of the input raw image.

The detail restoration deep learning network is an example network of the first deep learning network in the foregoing method embodiment. The detail restoration deep learning network is configured to perform detail restoration on the preprocessed image. Specifically, the detail restoration deep learning network is configured to implement step 303. Refer to the description of the 303 part in the foregoing method embodiment for details, which are not described herein again. In an optional solution, defect pixel correction and phase pixel compensation are implemented by the preprocessing module, and demosaicing, noise reduction, and SR reconstruction are implemented by the detail restoration deep learning network. In an optional case, demosaicing, noise reduction, defect pixel correction, sharpening, and phase pixel compensation functions are all implemented by the detail restoration deep learning network.

The brightness and color enhancement module is configured to perform brightness enhancement and color enhancement on an image output by the detail restoration deep learning network. It should be understood that brightness enhancement and color enhancement may be implemented by a same module, or may be implemented by different modules. In other words, a brightness enhancement module and a color enhancement module may be two different modules. In an optional case, brightness enhancement and color enhancement may be implemented by a plurality of modules. For example, each processing related to the brightness enhancement or the color enhancement corresponds to one module.

For example, the brightness and color enhancement module is configured to implement step 304. Refer to the description of the 304 part in the foregoing method embodiment for details, which are not described herein again.

The image may be sent to the display for display or stored in the memory after processed by the image processing framework.

Figure 8:
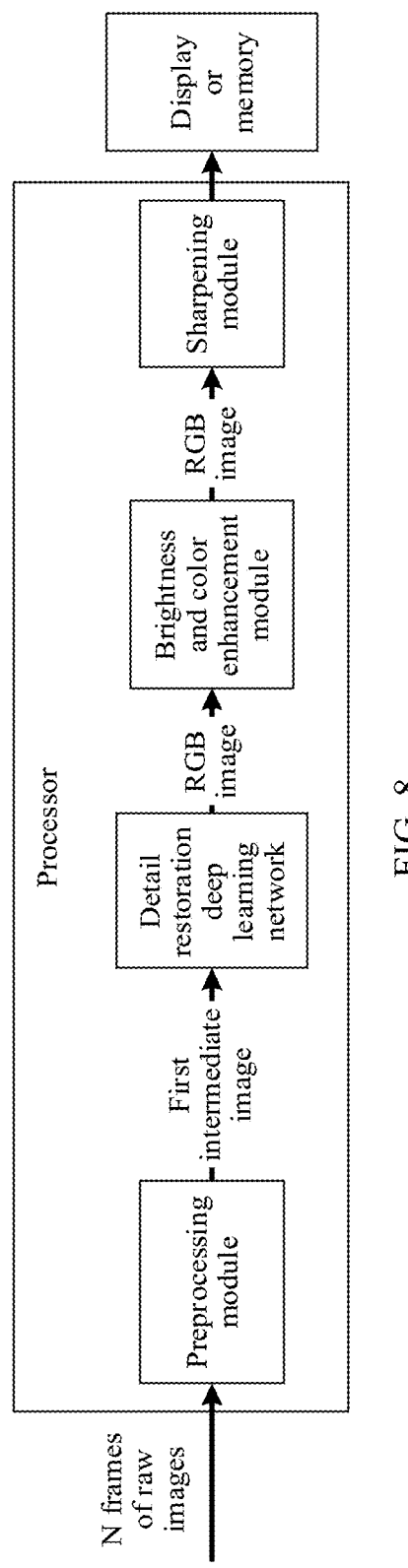
FIG. 8 shows another example image processing framework according to an embodiment of this application.

FIG. 8 shows another example image processing framework according to an embodiment of this application. The image processing framework shown in FIG. 8 may also be configured to implement the image processing method shown in FIG. 3. The image processing framework includes: a preprocessing module, a detail restoration deep learning network, a brightness and color enhancement module, and a sharpening module. Optionally, the image processing framework further includes a display and a memory. Different from the framework shown in FIG. 7, the framework in FIG. 8 has the sharpening module behind the brightness and color enhancement module because brightness enhancement and color enhancement may affect sharpness of an image edge. Therefore, after brightness enhancement and color enhancement, an image is sharpened based on an actual requirement. For other parts, refer to the image processing framework shown in FIG. 7. It should be understood that the brightness and color enhancement module shown in FIG. 8 may also be referred to as an enhancement module, and the enhancement module is configured to implement at least one of brightness enhancement or color enhancement.

Figure 9:
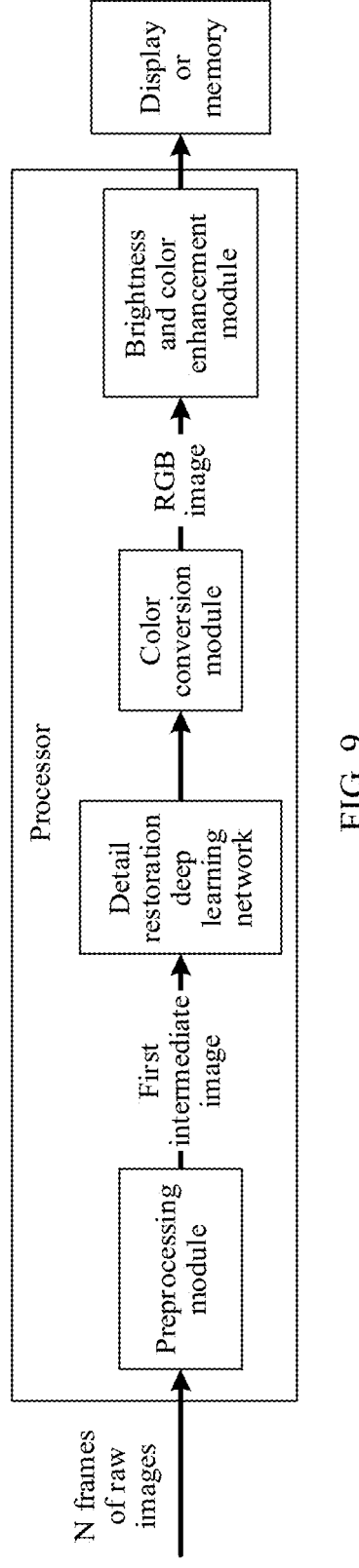
FIG. 9 shows another example image processing framework according to an embodiment of this application.

FIG. 9 shows another example image processing framework according to an embodiment of this application. The image processing framework shown in FIG. 9 may also be configured to implement the image processing method shown in FIG. 3. The image processing framework includes: a preprocessing module, a detail restoration deep learning network, a color conversion module, and a brightness and color enhancement module. Optionally, the image processing framework further includes a display and a memory.

An input of the image processing framework is N frames of raw images. The N frames of raw images may be in an RYYB format or an XYZW format. When the input raw images are in the RYYB format, a first intermediate image output by the preprocessing module includes 4N frames of sub-images. Specifically, the 4N frames of sub-images include N frames of sub-images including an R component, N frames of sub-images including a Y component, N frames of sub-images including a Y component, and N frames of sub-images including a B component, and an image obtained after processing by the detail restoration deep learning network is a color image of three channels RYB. When the input raw images are in the XYZW format, a first intermediate image output by the preprocessing module includes 4N frames of sub-images. Specifically, the 4N frames of sub-images include N frames of sub-images including an X component, N frames of sub-images including a Y component, N frames of sub-images including a Z component, and N frames of sub-images including a W component, and an image obtained after processing by the detail restoration deep learning network is a color image of four channels XYZW. Therefore, in the foregoing two cases, a color conversion module is further provided behind the detail restoration deep learning network, configured to convert the RYB or XYZW color image into an RGB color image. It should be understood that for a format of the input raw image, when an image output by the detail restoration deep learning network is not a color image in the RGB format, a color conversion module needs to be added behind the detail restoration deep learning network, so as to convert an image in another non-RGB format into an RGB color image. After the image is converted into the RGB color image, the image is sent to the display for display or stored in the memory after processed by the brightness and color enhancement module.

In an optional solution, a sharpening module may be added behind the brightness and color enhancement module in the image processing framework shown in FIG. 9. It should be understood that the brightness and color enhancement module shown in FIG. 9 may also be referred to as an enhancement module, and the enhancement module is configured to implement at least one of brightness enhancement or color enhancement.

Figure 10:
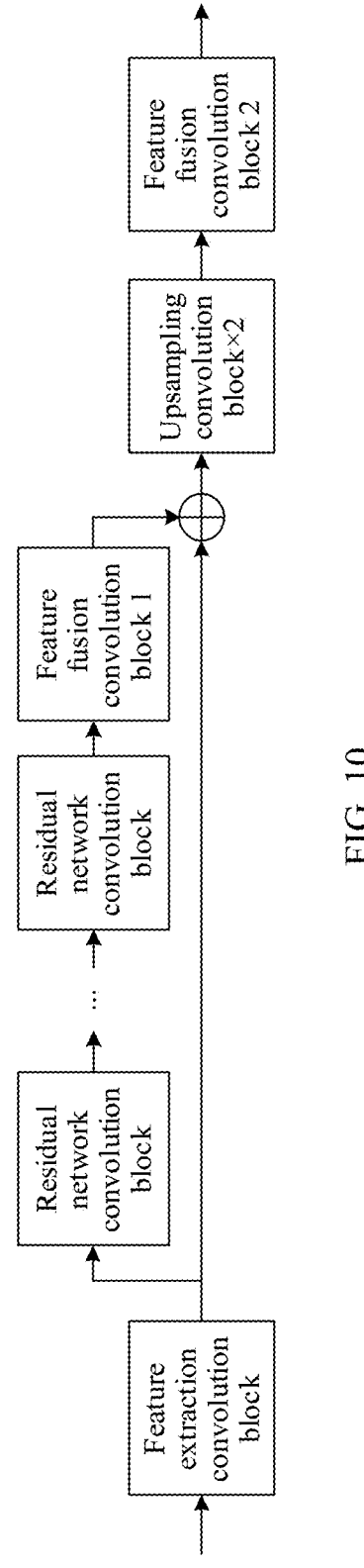
FIG. 10 is a schematic diagram of a structure of an example deep learning network according to an embodiment of this application.
Figure 11:
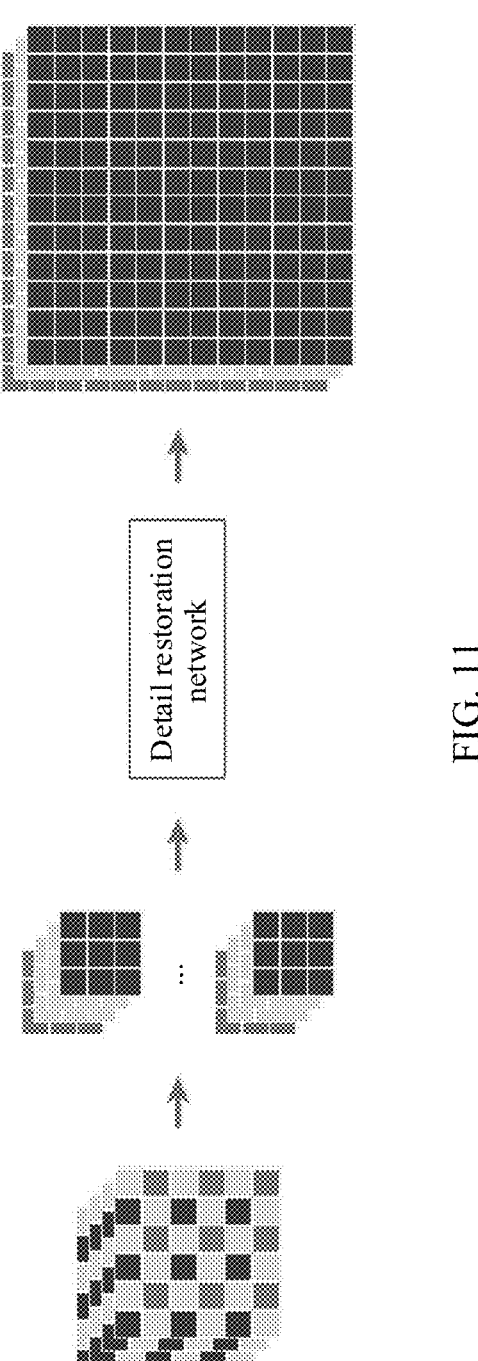
FIG. 11 is a schematic diagram of a processing effect of an example detail restoration network according to an embodiment of this application.

FIG. 10 is a schematic diagram of a structure of an example deep learning network according to an embodiment of this application. It should be understood that, in FIG. 10, the structure of the deep learning network is described by using a 2× zoom as an example. There is a network structure in another form. A specific form of the network structure is not limited in this embodiment of this application. It should be understood that if a length and a width of an output image of the deep learning network are respectively twice a length and a width of an input image, it indicates that a magnification factor of the deep learning network is 2. If a length and a width of an output image of the deep learning network are respectively four times a length and a width of an input image, it indicates that a magnification factor of the deep learning network is 4. The 2× zoom means that a length and a width of a final output image are respectively twice a length and a width of an originally input image. It should be understood that the originally input image is different from an input image of the deep learning network, and the input image of the deep learning network is obtained by preprocessing the originally input image. FIG. 11 is a schematic diagram of a processing effect of an example detail restoration network according to an embodiment of this application. The detail restoration network is a deep learning network with a 2× zoom, an originally input image is four frames of raw images with a size of 6*6, and an input image of the detail restoration network is obtained after preprocessing of the originally input image. The input image of the detail restoration network is sub-images with a size of 3*3 that are obtained by performing channel splitting and pixel rearrangement on the originally input raw images and that include four components R, G, G, and B. After channel splitting and pixel rearrangement are performed on one frame of 6*6 raw image, four frames of 3*3 sub-images are obtained. After the four frames of 6*6 raw images are split, a total of 16 frames of sub-images are obtained (only eight frames are shown in the figure). After processing of the detail restoration network, an output image is a 12*12 RGB color image.

Referring to FIG. 10, the deep learning network includes a feature extraction convolution block, a plurality of residual network convolution blocks, a feature fusion block 1, two upsampling convolution blocks, and a feature fusion convolution block 2.

Figure 12:
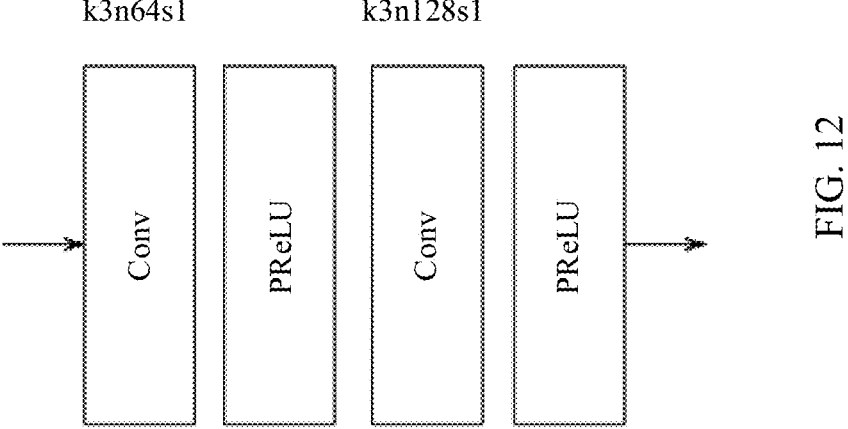
FIG. 12 is a diagram of a structure of an example feature extraction convolution block according to an embodiment of this application.
Figure 13:
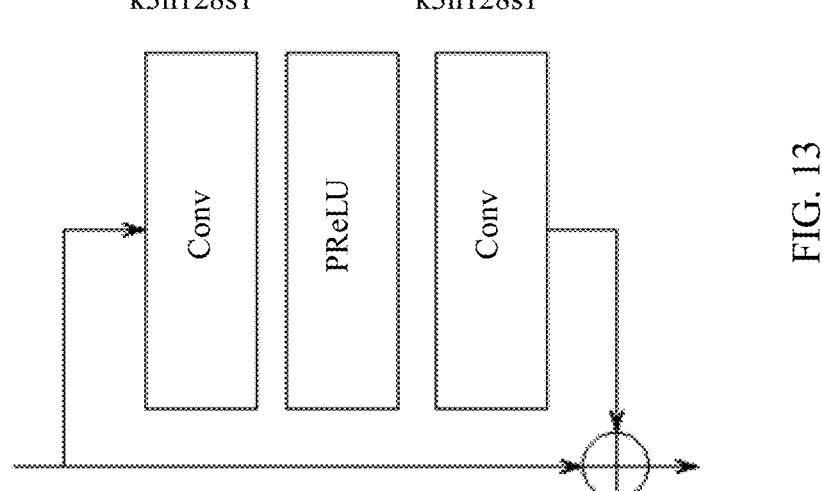
FIG. 13 is a diagram of a structure of an example residual network convolution block according to an embodiment of this application.

FIG. 12 is a diagram of a structure of an example feature extraction convolution block according to an embodiment of this application. The feature extraction convolution block includes a first convolutional layer Cony (k3n64s1), a first activation function layer (PReLU), a second convolutional layer Cony (k3n128s1), and a second activation function layer (PReLU). k represents a size of a convolution kernel, n represents a quantity of channels of a feature map after convolution, and s represents a convolution stride. It should be understood that k, n, and s in subsequent structure diagrams shown in FIG. 13 to FIG. 15 represent the same physical meanings. That is, for the first convolutional layer shown in FIG. 12, a size of a convolution kernel is 3, a quantity of channels of a feature map after convolution is 64, and a convolution stride is 1. For the second convolutional layer, a size of a convolution kernel is 3, a quantity of channels of a feature map after convolution is 128, and a convolution stride is 1. It should be understood that this embodiment of this application provides only an example structure of the feature extraction convolution block, and there may alternatively be another structure. For example, quantities of convolutional layers and activation function layers may not be 2, and values of k, n, and s in the convolutional layers are optional. In an optional case, the detail restoration network may include no feature extraction convolution block, or may include a plurality of feature extraction convolution blocks.

FIG. 13 is a diagram of a structure of an example residual network convolution block according to an embodiment of this application. The residual network convolution block includes a first convolutional layer Cony (k3n128s1), an activation function layer (PReLU), and a second convolutional layer Cony (k3n128s1). It should be understood that in the structure of the detail restoration network shown in FIG. 10, there are a plurality of residual network convolution blocks, or it may be described as follows: an operation of a residual network convolution block needs to be performed a plurality of times. For example, a quantity of residual network convolution blocks may be set to 6.

FIG. 14A and FIG. 14B are diagrams of structures of an example feature fusion block 1 and feature fusion block 2 according to an embodiment of this application. The feature fusion block 1 includes a convolutional layer Cony (k3n128s1). The feature fusion block 2 includes a convolutional layer Cony (k3n3s1). That is, for the convolutional layer of the feature fusion block 1, a size of a convolution kernel is 3, a quantity of channels of a feature map is 128, and a convolution stride is 1. For the convolutional layer of the feature fusion block 2, a size of a convolution kernel is 3, a quantity of channels of a feature map is 3, and a convolution stride is 1. It should be understood that, because image data output by the feature fusion block 2 is output data of the detail restoration network, when the output data of the detail restoration network is RGB color data, a quantity of feature channels of the feature fusion block 2 is 3, and values of k and s of the feature fusion block 2 and k, n, and s of the feature fusion block 1 are optional. It should be understood that the detail restoration network may include no feature fusion block 1, or may include a plurality of feature fusion blocks 1. In an optional case, when an input raw image is an image in an XYZW format, a quantity of feature channels of the feature fusion block 2 is 4, that is, an image output by the deep learning network includes four channels.

FIG. 15 is a diagram of a structure of an example upsampling convolution block according to an embodiment of this application. Because the deep learning network shown in FIG. 10 is a deep learning network with a 2× zoom, two upsampling convolution blocks are required. The upsampling convolution block includes a convolutional layer Cony (k3n256s1), a pixel shuffle layer PixelShuffler, and an activation function layer (PReLU). It should be understood that PixelShufflerX2 shown in FIG. 15 indicates that the pixel shuffle layer is a 2× upsampling pixel shuffle layer. Optionally, an upsampling convolution block with a magnification factor of 4 includes one 4× upsampling pixel shuffle layer, or includes two 2× upsampling pixel shuffle layers.

It should be understood that, corresponding to different sizes of raw images, input images, and output images, or different zoom factors, the structure of the deep learning network needs to be adjusted correspondingly, for example, having a different quantity of upsampling convolution blocks. The length and the width of the input raw image are respectively denoted as h0 and w0, the length and the width of the sub-image obtained after channel splitting are respectively denoted as h1 and w1, and the length and the width of the color image output by the deep learning network are respectively denoted as h2 and w2. In this case, a quantity of upsampling convolution blocks required in the deep learning network is $\log_2 r$, where r=h2/h1=w2/w1. When the input raw image is in the RGGB, RYYB, or XYZW format, h1/h0=½ and w1/w0=½. When the input raw image is in the Quad format, h1/h0=¼ and w1/w0=¼. If the input is a 10 M RGGB image, the output is a 10 M RGB image, that is, h0=h2, w0=w2, and r=h2/h1=w2/w1=h0/h1=w0/w1=2. Therefore, the quantity of up sampling convolution blocks is 1. If the input is a 10 M Quad image and the output is a 10 M RGB image, r=h2/h1=w2/w1=4h2/h0=4w2/w0=4, and the quantity of upsampling convolution blocks required is 2. If the input image is a 40 M image in the XYZW format and the output image is a 10 M color image of four channels XYZW, r=h2/h1=w2/w1=2h2/h0=2w2/w0=1. In this case, no upsampling convolution block is required.

To train a network, training data needs to be obtained. For example, a training data set may be formed by collecting a large quantity of matched low-quality input images and high-quality target images, to train the network. The low-quality input image is an image input to a deep learning network. The high-quality target image is a target image obtained after processing by a deep learning network that meets a requirement. For example, if a deep learning network that includes demosaicing, noise reduction, and SR reconstruction functions needs to be obtained by training, constructed training data includes: a plurality of frames of raw images with noise, mosaic, and a low resolution, and one frame of color image without noise or mosaic and with a high resolution. If a deep learning network that includes demosaicing, noise reduction, SR reconstruction, and defect pixel correction functions needs to be obtained by training, constructed training data includes: a plurality of frames of raw images with noise, mosaic, a low resolution, and a defect pixel, and one frame of color image without noise, mosaic, or defect pixels and with a high resolution. If a deep learning network that includes demosaicing, noise reduction, SR reconstruction, and sharpening functions needs to be obtained by training, constructed training data includes: a plurality of frames of blurry raw images with noise, mosaic, and a low resolution, and one frame of sharp color image without noise or mosaic and with a high resolution. If a deep learning network that includes demosaicing, noise reduction, SR reconstruction, defect pixel correction, and sharpening functions needs to be obtained by training, constructed training data includes: a plurality of frames of blurry raw images with noise, mosaic, a defect pixel, and a low resolution, and one frame of sharp color image without noise, mosaic, or defect pixels and with a high resolution. In conclusion, the constructed training data is related to a function of the deep learning network, and examples are not listed herein one by one.

However, in a realistic photographing environment, it is difficult to capture low-quality and high-quality images that are strictly aligned. Therefore, the training data is obtained by using an artificial synthesis method.

This embodiment of this application provides two example solutions for obtaining a high-quality image: First, a specific quantity of open data sets are downloaded through a network, and images of very good quality are selected from the open data sets. Second, a high-quality image that meets a preset condition is photographed by using a high-quality camera and strictly controlling a light source condition. The preset condition may be set correspondingly based on a specific requirement. It should be understood that the high-quality image that is photographed and output by the camera is a processed RGB color image that meets a human eye characteristic. Further, inverse gamma correction is performed on the obtained high-quality image, so that a brightness range of the high-quality image obtained after the inverse gamma correction is closer to a brightness range of a raw image obtained by the camera, and then downsampling is performed to obtain a high-quality target image (RGB color image) in training data. The downsampling may remove some minor imperfections, to further improve image quality. It should be understood that the high-quality images in the training data set may all be images obtained by using the first solution, or may all be images obtained by using the second solution, or may be images obtained by using the first solution and images obtained by using the second solution meet a specific ratio.

Next, this embodiment of this application provides an example solution for obtaining a low-quality image.

A series of quality degradation operations are performed on the obtained high-quality image, to obtain a low-quality input image. For example, to obtain a blurry raw image with noise, mosaic, a defect pixel, and a low resolution, the following operations are performed on the high-quality image: downsampling, Gaussian blur, noise addition, mosaicking processing, and defect pixel addition. If the deep learning network is a network with a 2× zoom, 2× downsampling is performed on the high-quality image, and blur intensity of the Gaussian blur may be randomly selected. It should be understood that, when the foregoing operations are performed on one frame of high-quality image, one frame of low-quality image may be obtained. If a plurality of frames of low-quality images need to be obtained, the foregoing operations are performed on one frame of high-quality image a plurality of times. In the foregoing manner of constructing training data, there are differences in noise, defect pixel, mosaic, resolution, and definition (blur) between an input low-quality image and an output high-quality target image. A network trained by using such training data can have demosaicing, noise reduction, SR reconstruction, defect pixel correction, and sharpening functions. Because the low-quality input image is obtained by simulation based on the high-quality image, the low-quality input image and the high-quality target image are strictly aligned, thereby further improving a training effect of network training.

For example, if to obtain a raw image with noise, mosaic, and a low resolution, the following operations are performed on the high-quality image: downsampling, noise addition, and mosaicking processing. In this embodiment of this application, corresponding quality degradation processing is performed on the high-quality image based on a low-quality image that needs to be obtained, and examples are not listed herein one by one.

In addition, when a plurality of frames of low-quality input images are constructed, the plurality of frames of low-quality input images are independently constructed, and there are differences in noise, defect pixel, and local definition between different low-quality input images. Therefore, the trained network has a capability of fusing a plurality of frames.

In this embodiment of this application, the high-quality image is first obtained, and the low-quality image is obtained by simulation by performing quality degradation processing on the high-quality image. Therefore, the low-quality input image and the high-quality target image in the constructed training data are strictly aligned. Further, the network is trained based on the constructed training data, and the obtained deep learning network can implement a plurality of types of processing related to image detail restoration. Moreover, because there are differences in noise, defect pixel, and local definition between the plurality of frames of input low-quality images, the trained deep learning network further has the capability of fusing a plurality of frames. Image processing based on the deep learning network can simultaneously implement functions related to image detail restoration, to convert an input raw image into a high-resolution RGB color image with a high definition, relatively low noise, and clear details. In addition, because the plurality of types of processing related to detail restoration are implemented by the deep learning network rather than in a serial processing order, mutual impact between the plurality of types of processing is avoided, and errors accumulated in a process of converting the low-quality raw image into the high-quality RGB color image are eliminated. Besides, when the deep learning network is trained, a plurality of frames of low-quality images are input, and one frame of high-quality image is output. Therefore, the deep learning network obtained by training further has the capability of fusing a plurality of frames. Based on this, during image processing, a plurality of frames of low-quality raw images are input, so that the deep learning network may integrate valid information of the plurality of frames of images, to further improve quality of an output image obtained after processing by the deep learning network.

The following describes a loss function of the deep learning network. The loss function is an important equation for measuring a difference between a predicted value and a target value. Because it is expected that an output of the deep neural network is as close as possible to a value that is actually expected to be predicted, a predicted value of a current network and a target value that is actually expected may be compared, and then a weight vector of each layer of neural network is updated based on a difference between the two. For example, if the predicted value of the network is higher, the weight vector is adjusted to obtain a lower predicted value. The weight vector is continuously adjusted until the neural network can predict the target value that is actually expected. How to determine the difference between the predicted value and the target value by comparison is defined by the loss function or an objective function. A higher output value (loss) of the loss function indicates a larger difference. In this case, training of the deep neural network changes to a process of minimizing the loss. In this embodiment of this application, L1 Loss or L2 Loss between the output of the network and the target image may be used as a loss function. Optionally, a combination of L1 Loss, structural similarity (Structural similarity, SSIM), and adversarial Loss may be used as a loss function, or a combination of L2 Loss, SSIM, and adversarial Loss may be used as a loss function.

For a method for training the deep learning network, in this embodiment of this application, an adaptive moment estimation (Adma) method may be used to optimize a network parameter. When a loss decreases to a relatively convergent state, it may be considered that the training is completed.

The image processing framework and image processing method provided in the embodiments of this application are applicable to a plurality of application scenarios or are applicable to a plurality of different photographing scenarios. The following describes application in different application scenarios:

Dark light scenario: This scenario has a relatively high requirement on a noise reduction effect, and a technology of fusing a plurality of frames is important. Therefore, in the dark light scenario, a quantity of frames of input images may be increased. For example, if four frames of images are input in a bright light scenario, six frames, eight frames, or nine frames of images may be input in the dark light scenario.

Zoom mode: The structure of the deep learning network varies with a zoom factor. A 4× zoom is described herein. Different from a network structure with a 2× zoom, three upsampling convolution blocks are required in a deep learning network with the 4× zoom. When training data is generated, when a high-quality image is processed to obtain a low-quality image, 4× downsampling needs to be performed. It should be understood that the 4× downsampling indicates that a length and a width of an image obtained after the downsampling are respectively one quarter of a length and a width of a raw image, that is, an area of the image obtained after the downsampling is one sixteenth of an area of the raw image.

HDR scenario: A plurality of frames of short-exposure images are input, and it is ensured as much as possible that a high-brightness region is not overexposed. Then, details of the image, especially dark details of the image, are restored based on the detail restoration network. Further, brightness enhancement is performed, by using the brightness enhancement module, on an image output by the detail restoration network, to restore a dynamic range of the entire image, and implement an HDR function. In the HDR scenario, input data is a plurality of frames of short-exposure raw images, for example, six frames or eight frames. Correspondingly, when an HDR deep learning network is trained, some short-exposure training data needs to be added to training data. This embodiment of this application provides a method for obtaining short-exposure training data: randomly selecting a properly exposed high-quality image, and performing inverse gamma correction on the high-quality image to obtain an inverse gamma correction image, where a brightness range of the inverse gamma correction image is consistent with a brightness range of a raw image obtained by a camera; and dividing each pixel value of the first intermediate image by a number, where the number indicates a degree of reducing exposure of the properly exposed image. For example, when each pixel value is divided by 2, it indicates that an exposure time of a short-exposure image obtained by simulation is ½ of an exposure time of the properly exposed raw image; when each pixel value is divided by 4, it indicates that an exposure time is ¼ of the exposure time; and so on. Optionally, the value of the number depends on an exposure reduction ratio that may be selected when the image is actually captured. For example, the value may be 2, 4, 8, or 16.

An embodiment of this application further provides a method for adaptively selecting a deep learning network. As shown in FIG. 16, the method includes the following steps:

1601: Select, from a deep learning network resource pool based on first indication information, a target deep learning network corresponding to the first indication information. The deep learning network resource pool includes a plurality of deep learning networks having different functions.

For example, the plurality of deep learning networks having different functions include: a plurality of deep learning networks in different zoom scenarios, a deep learning network in an HDR scenario, a deep learning network in a dark light scenario, a deep learning network in a night mode, a first detail restoration network having demosaicing, noise reduction, and SR reconstruction functions, a second detail restoration network having mosaic, noise reduction, SR reconstruction, and sharpening functions, and a third detail restoration network having mosaic, noise reduction, SR reconstruction, and defect pixel correction functions. The plurality of deep learning networks having different functions are obtained by training in advance, and are fixed or stored in a memory of a mobile terminal or a storage unit of a processor of the mobile terminal. In an optional case, the deep learning networks may alternatively be trained in real time and continuously updated. In an optional solution, the plurality of deep learning networks having different functions are implemented by using software algorithms, and hardware computing resources in an NPU or a GPU are invoked based on the software algorithms to implement processing functions of the deep learning networks. It should be understood that the hardware resources may alternatively be hardware resources other than those in the NPU or the GPU. In an optional solution, deep learning networks having different functions are separately fixed in different artificial intelligence AI engines. One deep learning network corresponds to one AI engine. The AI engine is a hardware module or a dedicated hardware circuit. A plurality of AI engines may share a computing resource in a computing resource pool.

For example, the first indication information may be selected and sent by a user based on a requirement of the user or based on a current scenario characteristic. For example, the user selects an applicable or preferred application scenario by touching a mode selection button in an application APP interface, and sends first indication information corresponding to the application scenario. The first indication information is sent to an AI controller in the mobile terminal or the processor. Further, the AI controller selects or enables a corresponding AI engine or a corresponding deep learning network based on the first indication information. Alternatively, the AI controller reads the corresponding deep learning network based on the first indication information, and loads the deep learning network into the processor.

In an optional case, the first indication information is obtained by analyzing a characteristic of a current preview image obtained by a camera. The characteristic of the preview image is related to a current application scenario. In other words, characteristics of preview images obtained in different application scenarios are different. The current application scenario may be determined by analyzing the characteristic of the preview image, and first indication information used to indicate the current application scenario may be obtained. The AI controller selects, from the deep learning network resource pool based on the first indication information, a deep learning network that is applicable to the current application scenario. For example, if the characteristic of the current preview image matches the dark light scenario, the AI controller selects the dark light deep learning network as a target deep learning network. Further, the camera is controlled to photograph a plurality of frames of properly exposed images as an input. It should be understood that in the dark light scenario, a noise reduction effect needs to be considered, and a quantity of frames of input images needs to be appropriately increased. If the characteristic of the current preview image matches the HDR scenario, the AI controller selects the HDR deep learning network as a target deep learning network. Further, the camera is controlled to photograph a plurality of frames of short-exposure images as an input. Optionally, the camera may alternatively be controlled to obtain a plurality of frames of images with different exposure times as an input. The plurality of frames of images with different exposure times may include several images with a relatively long exposure time and several images with a relatively short exposure time.

In an optional case, the first indication information is carried in input data. For example, the first indication information is a zoom factor carried in the input data. When the AI controller receives the zoom factor carried in the input data, a deep learning network corresponding to the zoom factor is selected or enabled.

1602: Process input image data based on the target deep learning network to obtain a first output image.

Optionally, the first output image may be a target high-quality image that is finally output.

In an optional case, the method further includes:

1603: Perform brightness enhancement and color enhancement on the first output image to obtain a second output image.

In an optional case, the method further includes:

1604: Perform color gamut conversion or color format conversion on the second output image, to obtain a target output image that can be displayed on a display.

In an optional case, before 1601, the method further includes: obtaining N frames of raw images; and preprocessing the N frames of obtained raw images, to obtain the input image data that is input to the deep learning network.

For example, the preprocessing includes image registration, motion compensation, channel splitting, and pixel rearrangement.

In an optional case, after 1603, the second output image may be further sharpened.

In the method for adaptively selecting a deep learning network that is provided in this embodiment of this application, a most appropriate deep learning network may be selected or enabled from the deep learning network resource pool based on a requirement of a user or a characteristic of input data or based on a parameter carried in the input data, to meet requirements of different users or different scenarios to the greatest extent. In addition, an optimal deep learning network can be provided in different scenarios, to provide an optimal image processing effect, which optimizes user experience, improves image processing performance of a mobile terminal or an image processor, and enhances competitiveness.

Figure 17:
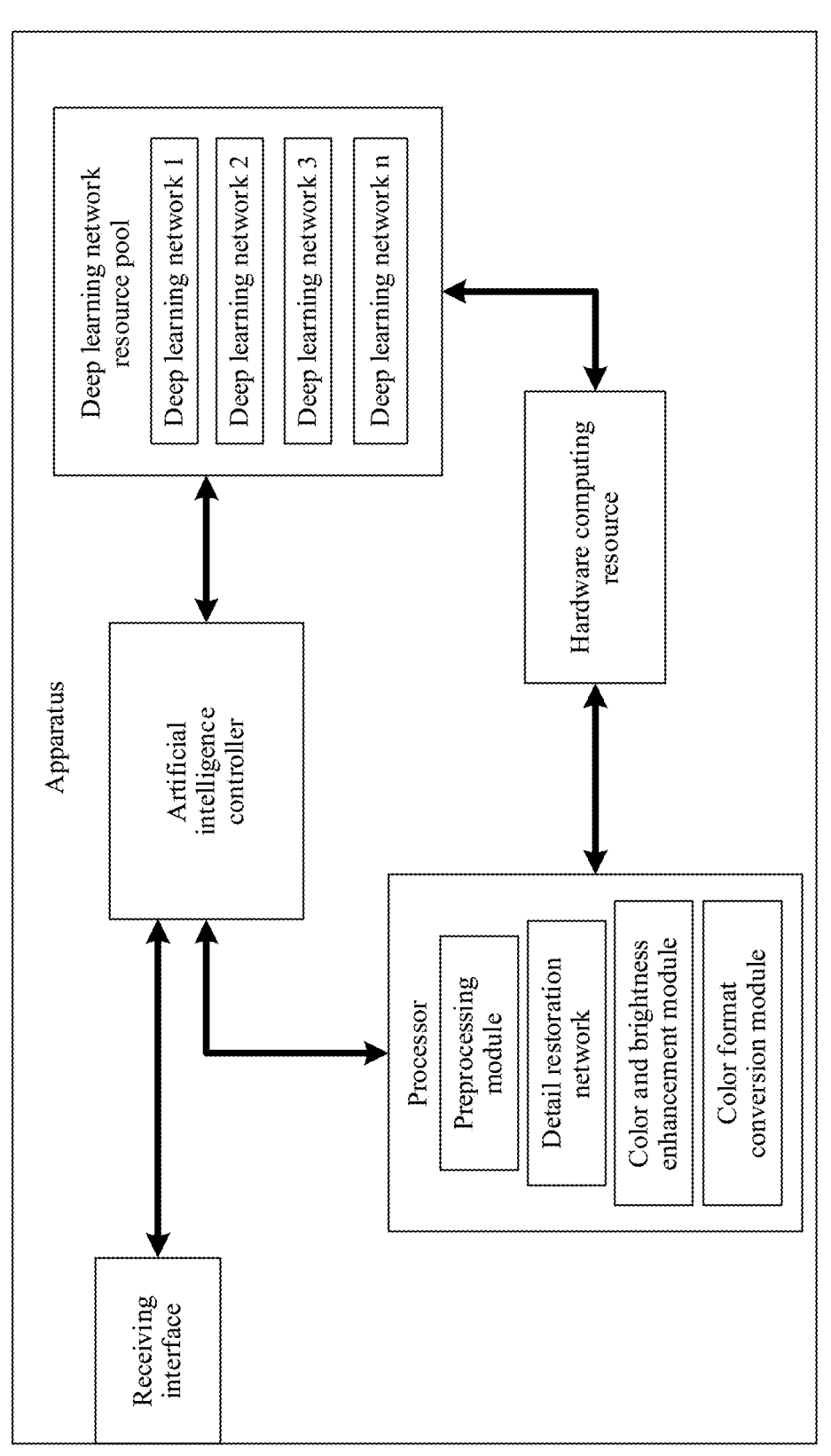
FIG. 17 shows an example apparatus for adaptively selecting a deep learning network according to an embodiment of this application.

An embodiment of this application further provides an apparatus for adaptively selecting a deep learning network. As shown in FIG. 17, the apparatus includes: a receiving interface, an artificial intelligence controller, and a deep learning network resource pool. The deep learning network resource pool includes deep learning networks having a plurality of functions.

The receiving interface is configured to receive image data, indication information, or various control signals, for example, may be configured to receive indication information of a mode or a scenario selected by a user in an application APP interface on a display of a mobile terminal, or may be configured to receive image data obtained by a camera.

The artificial intelligence AI controller is coupled to the deep learning network resource pool. The artificial intelligence controller selects, from the deep learning network resource pool based on first indication information, a target deep learning network corresponding to the first indication information. Optionally, the first indication information may be indication information received from the user by using the receiving interface, or may be scenario-related indication information obtained by the apparatus by performing characteristic analysis on a preview image obtained by the camera, or may be indication information carried in input image data. For example, the artificial intelligence controller may be implemented by a dedicated hardware circuit, or may be implemented by a general-purpose processor or CPU, or may be implemented by a software module running on a processor. The deep learning network is implemented by an AI engine. The AI engine is a hardware module or a dedicated hardware circuit. Alternatively, the deep learning network is implemented by software code or a software module. When the deep learning network is implemented by software code or a software module, the deep learning network resource pool is stored in a memory.

Optionally, the apparatus further includes a processor. The processor may be, for example, a GPU, an NPU, an ISP, a general-purpose AP, or another intelligent processor. The processor processes an input image based on the target deep learning network to obtain a first output image. When the deep learning network is implemented by software code or a software module, the deep learning network runs on the processor. For example, the AI controller reads the target deep learning network from the deep learning network resource pool, and loads the target deep learning network into the processor. Then, the processor runs the target deep learning network to implement a function corresponding to the target deep learning network. For example, the selected target deep learning network may be loaded into a detail restoration network shown in FIG. 17.

Optionally, the apparatus further includes a hardware computing resource. The hardware computing resource includes addition, subtraction, multiplication, division, an exponential operation, a logarithmic operation, value comparison, and the like. The hardware computing resource may be multiplexed by a plurality of deep learning networks. Specifically, when running the target deep learning network, the processor invokes, based on an indication of the target deep learning network, a computing resource in the hardware computing resource to process the input image, so as to implement a function corresponding to the target deep learning network.

Optionally, the apparatus further includes a preprocessing module. The preprocessing module is configured to preprocess an initially input raw image before the deep learning network. The preprocessing may include the preprocessing described in the 302 part. Optionally, the preprocessing module may further analyze the characteristic of the preview image obtained by the camera, and send a characteristic signal to the AI controller. The AI controller selects, based on the characteristic signal, a corresponding deep learning network from the deep learning network resource pool. Optionally, a characteristic of the raw image may alternatively be analyzed by a dedicated image characteristic analysis module or implemented by a general-purpose processor.

Optionally, the apparatus further includes a color enhancement module and a brightness enhancement module. The color enhancement module is configured to perform color enhancement on the first output image output by the deep learning network. The brightness enhancement module is configured to perform brightness enhancement on the first output image output by the deep learning network. It should be understood that the color enhancement and the brightness enhancement may alternatively be implemented by a same module, and the color enhancement and the brightness enhancement may be implemented by a hardware module, or may be implemented by a software module, or may be implemented by a combination of a software module and a hardware module.

Optionally, the apparatus further includes a color format conversion module, configured to convert an image to an image format supported by a display or a target format specified by the user.

It should be understood that the preprocessing module, the color enhancement and brightness enhancement modules, and the color format conversion module may all be implemented by the processor.

The apparatus for adaptively selecting a deep learning network that is provided in this embodiment of this application includes a deep learning network resource pool, so that an appropriate deep learning network may be selected based on a mode selected by a user, or an appropriate deep learning network may be selected by adaptively analyzing a characteristic of an input image, or an appropriate deep learning network may be selected based on a characteristic parameter carried in the input image. In a plurality of application scenarios, an image can be processed based on an optimal deep learning network, so that an optimal image processing effect can be achieved in the scenarios, which improves user experience, improves image processing performance of a mobile terminal or an image processor, and enhances competitiveness.

An embodiment of this application further provides a computer-readable storage medium. The computer-readable storage medium stores instructions. When the instructions are run on a computer or a processor, the computer or the processor is enabled to perform one or more steps in any one of the foregoing methods. When component modules of the image processing apparatus are implemented in a form of a software function unit and sold or used as an independent product, the component modules may be stored in the computer-readable storage medium.

Based on such an understanding, an embodiment of this application further provides a computer program product including instructions. When the computer program product is run on a computer or a processor, the computer or the processor is enabled to perform any method provided in embodiments of this application. The technical solutions of this application essentially, or the part contributing to the conventional technology, or all or some of the technical solutions may be implemented in a form of a software product. The computer software product is stored in a storage medium, and includes several instructions for instructing a computer device or a processor in a computer device to perform all or some of the steps of the methods in the embodiments of this application.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application. For example, for some specific operations in the apparatus embodiments, refer to the foregoing method embodiments.

What is claimed is:

1. An image processing method, comprising:
obtaining a first plurality of frames of raw images having a first resolution;
preprocessing the first plurality of frames to obtain a first intermediate image, wherein the preprocessing comprises channel splitting and pixel rearrangement, wherein the first intermediate image comprises sub-images belonging to a plurality of channels, and wherein a sub-image of each channel of the channels comprises only one color component;
processing the first intermediate image with a first deep learning network that simultaneously performs demosaicing (DM), super-resolution (SR) reconstruction, and noise reduction, to obtain a first target image, wherein the first target image has a second resolution that is greater than the first resolution; and
performing at least one of brightness enhancement or color enhancement on the first target image to obtain a second target image.

2. The image processing method of claim 1, wherein the first deep learning network further performs defect pixel correction.

3. The image processing method of claim 1, wherein the functions of the first deep learning network further comprise phase pixel compensation.

4. The image processing method of claim 1, further comprising:

sharpening the second target image to obtain a third target image; and sending the third target image to a display or a memory.

5. The image processing method of claim 1, wherein the raw images are red, yellow, yellow, blue (RYYB) images or images comprising four different color components, wherein before performing at least one of brightness enhancement or color enhancement on the first target image, the image processing method further comprises performing color conversion on the first target image to obtain a red, green, blue (RGB) color image, and wherein performing at least one of brightness enhancement or color enhancement on the first target image comprises performing at least one of brightness enhancement or color enhancement on the RGB color image to obtain the second target image.

6. The image processing method of claim 1, wherein the preprocessing comprises:

performing channel splitting and pixel rearrangement on the first plurality of frames to obtain a second plurality of frames of sub-images that respectively belong to M channels, wherein a quantity of the second plurality of frames in each channel is equal to a quantity of frames of the first plurality of frames; and aligning the second plurality of frames in each channel.

7. The image processing method of claim 1, wherein the preprocessing comprises:

performing at least one of black level correction (BLC), auto-white balance (AWB), or lens shading correction (LSC) on the first plurality of frames to obtain a second plurality of frames of first preprocessed raw images;

performing channel splitting and pixel rearrangement on the second plurality of frames to obtain a third plurality of frames of sub-images that respectively belong to M channels, wherein a quantity of the third plurality of frames in each channel is equal to a quantity of the first plurality of frames; and aligning the third plurality of frames in each channel.

8. The image processing method of claim 1, wherein the first deep learning network comprises a plurality of residual network convolution blocks, at least one upsampling convolution block, and a second feature fusion block, wherein an output of the second feature fusion block is an output of the first deep learning network, and wherein a quantity of feature channels of the second feature fusion block is 3 or 4.

9. The image processing method of claim 1, wherein the image processing method is applied to a high dynamic range (HDR) scenario, wherein the first plurality of frames are frames of short-exposure raw images, wherein training data of the first deep learning network comprises a second plurality of frames of short-exposure training images, and wherein the image processing method further comprises obtaining each short-exposure training image by:

performing inverse gamma correction on a properly exposed high-quality image to obtain an inverse gamma correction image; and dividing each pixel value of the inverse gamma correction image by a number to obtain the short-exposure training image.

10. The image processing method of claim 1, wherein the image processing method is applied to a dark light scenario when a quantity of frames of input raw images is increased relative to a number of frames used in a bright light scenario, wherein the first deep learning network is a target deep learning network selected from a deep learning network resource pool based on first indication information that is selected by a user in an application interface and that is related to an application scenario, wherein the first indication information is indication information that is obtained by analyzing a characteristic of a preview image obtained by a camera and that is related to the application scenario, or wherein the first indication information is magnification information carried in the first plurality of frames.

11. An image processing apparatus, comprising:

a receiving interface configured to receive, from a camera, a first plurality of frames of raw images having a first resolution; and a processor coupled to the receiving interface and configured to:

preprocess the first plurality of frames to obtain a first intermediate image, wherein the preprocessing comprises channel splitting and pixel rearrangement, wherein the first intermediate image comprises sub-images belonging to a plurality of channels, and wherein a sub-image of each channel comprises only one color component;

process the first intermediate image with a first deep learning network that simultaneously performs demosaicing (DM), super-resolution (SR) reconstruction, and noise reduction, to obtain a first target image, wherein the first target image has a second resolution that is greater than the first resolution; and perform at least one of brightness enhancement or color enhancement on the first target image to obtain a second target image.

12. The image processing apparatus of claim 11, wherein the first deep learning network further performs defect pixel correction.

13. The image processing apparatus of claim 11, wherein the processor is further configured to:

sharpen the second target image to obtain a third target image; and send the third target image to a display or a memory.

14. The image processing apparatus of claim 11, wherein the processor is further configured to:

perform color conversion on the first target image to obtain a red green blue (RGB) color image; and perform at least one of brightness enhancement or color enhancement on the RGB color image to obtain the second target image.

15. The image processing apparatus of claim 11, wherein the processor is further configured to:

perform at least one of black level correction (BLC), auto-white balance (AWB), or lens shading correction (LSC) on the first plurality of frames to obtain a second plurality of frames of first preprocessed raw images;

perform channel splitting and pixel rearrangement on the second plurality of frames to obtain a third plurality of frames of sub-images that respectively belong to M channels, wherein a quantity of the third plurality of frames in each channel is equal to a quantity of the first plurality of frames; and align the third plurality of frames in each channel.

16. The image processing apparatus of claim 11, wherein the image processing apparatus is applied to a zoom mode and a quantity of upsampling convolution blocks in the first deep learning network is related to a zoom factor.

17. The image processing apparatus of claim 11, wherein the first deep learning network is a target deep learning network selected from a deep learning network resource pool based on first indication information that is selected by a user in an application interface and that is related to an application scenario, wherein the first indication information is obtained by analyzing a characteristic of a preview image from the camera and is related to the application scenario, or wherein the first indication information is magnification information carried in the first plurality of frames.

18. The image processing apparatus of claim 11, wherein the first deep learning network further performs a sharpening function.

19. The image processing apparatus of claim 11, wherein the first deep learning network further performs a phase pixel compensation.

20. The image processing apparatus of claim 11, wherein the raw images are red, yellow, yellow, blue (RYYB) images or images comprising four different color components.

* * * * *